(12) United States Patent
Ikeyama et al.

(10) Patent No.: US 8,617,397 B2
(45) Date of Patent: *Dec. 31, 2013

(54) REVERSE OSMOSIS FILTRATION DEVICES WITH RFID TAG-POWERED FLOW AND CONDUCTIVITY METERS

(75) Inventors: Norio Ikeyama, Osaka (JP); Mark Wilf, San Diego, CA (US)

(73) Assignees: Hydranautics, Oceanside, CA (US); Nitto Denko Corporation, Osaka (JP)

( * ) Notice: Subject to any disclaimer, the term of this patent is extended or adjusted under 35 U.S.C. 154(b) by 1124 days.

This patent is subject to a terminal disclaimer.

(21) Appl. No.: 12/065,711

(22) PCT Filed: Sep. 7, 2006

(86) PCT No.: PCT/US2006/034905
§ 371 (c)(1),
(2), (4) Date: Aug. 4, 2008

(87) PCT Pub. No.: WO2007/030647
PCT Pub. Date: Mar. 15, 2007

(65) Prior Publication Data
US 2008/0296208 A1  Dec. 4, 2008

Related U.S. Application Data

(60) Provisional application No. 60/714,982, filed on Sep. 7, 2005.

(51) Int. Cl.
*B01D 61/12* (2006.01)
*B01D 63/10* (2006.01)
*B01D 63/12* (2006.01)

(52) U.S. Cl.
USPC ............. 210/652; 210/85; 210/87; 210/96.2; 210/321.72; 210/739; 96/417; 324/439

(58) Field of Classification Search
USPC ............. 210/85, 87, 96.1, 96.2, 103, 321.83, 210/321.85, 650, 651, 739, 321.74, 321.76, 210/321.79, 321.8, 321.88, 321.89, 746, 210/321.6, 321.72, 652; 96/417–423, 8; 378/147; 156/306.6; 73/861.71–861.79; 324/439, 446; 702/30, 34, 35, 38, 45; 340/539.1, 340/10.34

See application file for complete search history.

(56) References Cited

U.S. PATENT DOCUMENTS 2,701,645 A   2/1955  Schild et al.
3,417,870 A   12/1968 Bray
(Continued)

FOREIGN PATENT DOCUMENTS

CN   1232718 A   10/1999
CN   1993171 A   7/2007
(Continued)

OTHER PUBLICATIONS

Australian Office Action for Australian Application No. 2007227628, dated Feb. 11, 2011, in 2 pages.
(Continued)

*Primary Examiner* — Joseph Drodge
(74) *Attorney, Agent, or Firm* — Knobbe, Martens, Olson & Bear LLP

(57) ABSTRACT

The present invention relates to reverse osmosis filtration devices, and more particularly, to membrane filtration devices (10, 11, 12) that have flow meters and fluid conductivity meters powered by RFID tags. Embodiments of the present invention comprise reverse osmosis filters and filtration systems comprising measuring devices, including flow and conductivity meters. The meters of the present invention are preferably located on or within permeate core tubes (16) of filtration devices and systems.

22 Claims, 15 Drawing Sheets

(56) References Cited

U.S. PATENT DOCUMENTS

| | | | |
|---|---|---|---|
| 3,554,378 A | | 1/1971 | Kohl |
| 4,142,414 A * | | 3/1979 | Cosentino ............... 73/216 |
| 4,188,817 A | | 2/1980 | Steigelmann |
| 4,235,723 A | | 11/1980 | Bartlett, Jr. |
| 4,409,849 A | | 10/1983 | Roos |
| 4,489,616 A * | | 12/1984 | Priddy ............... 73/861.79 |
| 4,496,461 A | | 1/1985 | Leeke et al. |
| 4,708,709 A | | 11/1987 | Zeller |
| 4,708,791 A | | 11/1987 | Dillard, III |
| 4,855,058 A | | 8/1989 | Holland et al. |
| 5,087,883 A * | | 2/1992 | Hoffman ............... 324/443 |
| 5,108,604 A | | 4/1992 | Robbins |
| 5,300,875 A | | 4/1994 | Tuttle |
| 5,461,385 A | | 10/1995 | Armstrong |
| 5,528,222 A | | 6/1996 | Moskowitz et al. |
| 5,581,017 A | | 12/1996 | Bejtlich, III |
| 5,674,381 A | | 10/1997 | Dekker |
| 5,905,197 A | | 5/1999 | Wilf |
| 6,040,773 A | | 3/2000 | Vega et al. |
| 6,051,144 A * | | 4/2000 | Clack et al. ............ 210/739 |
| 6,224,767 B1 | | 5/2001 | Fujiwara et al. |
| 6,253,625 B1 * | | 7/2001 | Samuelson et al. ........ 73/861.71 |
| 6,324,898 B1 | | 12/2001 | Cote et al. |
| 6,428,683 B1 * | | 8/2002 | Jaworowski et al. ........ 205/673 |
| 6,549,176 B2 | | 4/2003 | Hausladen |
| 6,558,444 B1 | | 5/2003 | Hunter |
| 6,607,501 B2 | | 8/2003 | Gorush |
| 6,609,070 B1 | | 8/2003 | Lueck |
| 6,617,963 B1 | | 9/2003 | Watters et al. |
| 6,628,107 B1 * | | 9/2003 | Bang et al. ............ 323/266 |
| 6,720,866 B1 * | | 4/2004 | Sorrells et al. ............ 340/10.4 |
| 6,971,274 B2 | | 12/2005 | Olin |
| 7,216,529 B2 | | 5/2007 | Ventresque et al. |
| 7,228,726 B2 | | 6/2007 | Kates |
| 7,410,581 B2 * | | 8/2008 | Arnold et al. ............ 210/321.85 |
| 7,481,917 B2 | | 1/2009 | Ikeyama et al. |
| 7,584,061 B2 * | | 9/2009 | Wilf et al. ............ 702/35 |
| 7,736,495 B2 * | | 6/2010 | Ikeyama et al. ............ 210/85 |
| 2002/0189667 A1 | | 12/2002 | O'Dougherty et al. |
| 2003/0017804 A1 | | 1/2003 | Heinrich et al. |
| 2003/0128812 A1 | | 7/2003 | Appelby et al. |
| 2004/0104171 A1 | | 6/2004 | Zeiher et al. |
| 2004/0112529 A1 | | 6/2004 | Karlsson et al. |
| 2004/0118776 A1 | | 6/2004 | Zeiher et al. |
| 2005/0029192 A1 | | 2/2005 | Arnold et al. |
| 2005/0060974 A1 | | 3/2005 | Palmerton et al. |
| 2005/0194317 A1 | | 9/2005 | Ikeyama et al. |
| 2005/0263386 A9 | | 12/2005 | Pitts et al. |
| 2005/0284806 A1 | | 12/2005 | Husain et al. |
| 2006/0077082 A1 * | | 4/2006 | Shanks et al. ............ 341/120 |
| 2006/0130663 A1 | | 6/2006 | Joshi et al. |
| 2006/0138031 A1 * | | 6/2006 | Kloos et al. ............ 210/96.2 |
| 2007/0018819 A1 | | 1/2007 | Streeb et al. |
| 2007/0240492 A1 | | 10/2007 | DiLeo et al. |
| 2007/0272628 A1 | | 11/2007 | Mickols et al. |
| 2008/0105038 A1 | | 5/2008 | Jons et al. |
| 2009/0032477 A1 | | 2/2009 | Ikeyama et al. |
| 2009/0320563 A1 | | 12/2009 | Wilf et al. |
| 2010/0096302 A1 * | | 4/2010 | Astle et al. ............ 210/85 |

FOREIGN PATENT DOCUMENTS

| | | |
|---|---|---|
| DE | 3740249 C | 11/1988 |
| DE | 196 27 595 A | 1/1997 |
| DE | 20104481 U1 | 7/2001 |
| DE | 101 60 429 A1 | 6/2003 |
| DE | 10254599 A1 | 6/2003 |
| EP | 0 700 313 B1 | 11/1996 |
| JP | 62-054152 | 3/1987 |
| JP | 05-345181 | 12/1993 |
| JP | 06-114239 | 4/1994 |
| JP | 09-054057 | 2/1997 |
| JP | 11-061867 | 3/1999 |
| JP | 11-066484 | 3/1999 |
| JP | 2002-150241 | 5/2002 |
| JP | 2003-323686 | 11/2003 |
| JP | 2005-135227 | 5/2005 |
| JP | 2005-169314 | 6/2005 |
| JP | 2005-288219 | 10/2005 |
| JP | 2006-195809 | 7/2006 |
| JP | 2007-527318 | 9/2007 |
| JP | 2008-049250 | 3/2008 |
| JP | 2008-080254 | 4/2008 |
| JP | 2008-526375 | 7/2008 |
| WO | WO 98/35327 A1 | 8/1998 |
| WO | WO 98/41306 | 9/1998 |
| WO | WO 00/40322 | 7/2000 |
| WO | WO 00/32298 | 8/2000 |
| WO | WO 00/45324 A3 | 8/2000 |
| WO | WO 00/50849 A1 | 8/2000 |
| WO | WO 00/67221 | 11/2000 |
| WO | WO 02/15139 A1 | 2/2002 |
| WO | WO 2005/068043 A1 | 7/2005 |
| WO | WO 2005/091959 A2 | 10/2005 |
| WO | WO 2006/026011 | 3/2006 |
| WO | WO 2006/074429 | 7/2006 |
| WO | WO 2007/030647 | 3/2007 |
| WO | WO 2007/108977 A2 | 9/2007 |

OTHER PUBLICATIONS

Chinese Office Action for Chinese Application No. 200780017198.2, issued Feb. 23, 2011, in 14 pages.
International Search Report for Application No. PCT/US07/06152, Mar. 12, 2008.
"HYDRAcap® Superior Ultrafiltration Membrane Technology" brochure by Hydranautics, A Nitto Denko Corporation (2001).
"RFID System Site Survey" Presentation to Hydranautics, a Nitto Denko Company, by GBN on Nov. 10, 2003.
Annex to European Search Report for application EP 05724483, mailed Mar. 13, 2007.
International Search Report for European Patent Application No. 06803131.9, dated Mar. 2, 2010 in 6 pages.
International Search Report for PCT/US06/34905 mailed Mar. 22, 2007.
Written Opinion for PCT/US06/34905 mailed Mar. 22, 2007.
European Office Action for Application No. 06803131.9-2113, dated Sep. 6, 2011, in 5 pages.
Office Action for Japanese application No. 2008-530205, dated Mar. 25, 2011, in 3 pages.
Office Action for Japanese Patent Application No. 2009-500407, dated Mar. 17, 2011, in 4 pages.

* cited by examiner

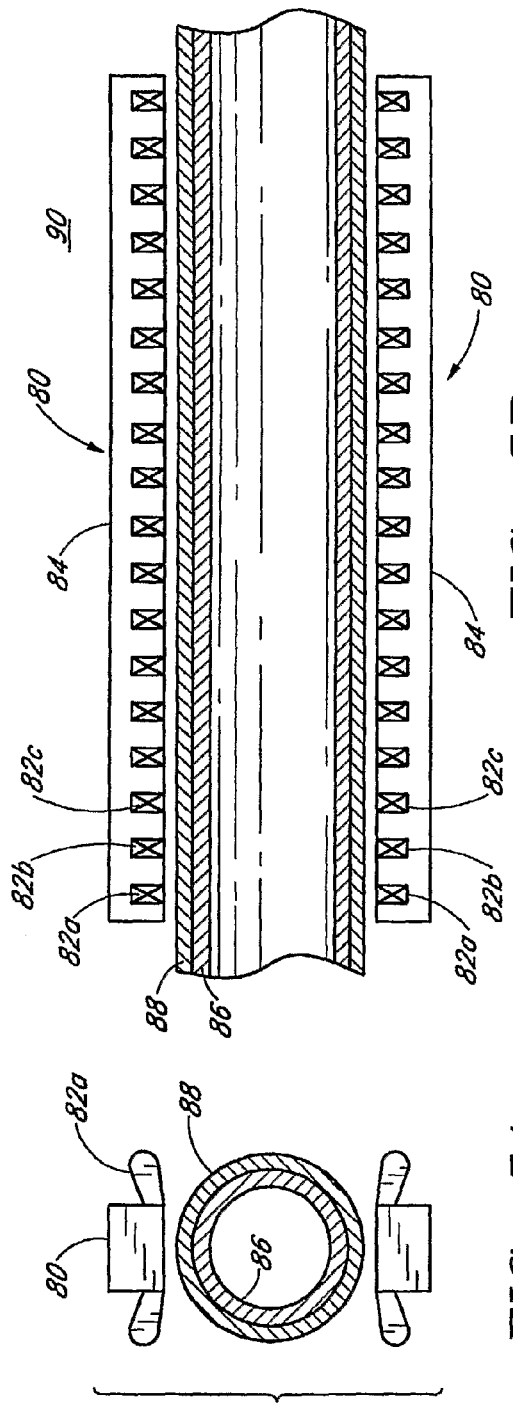
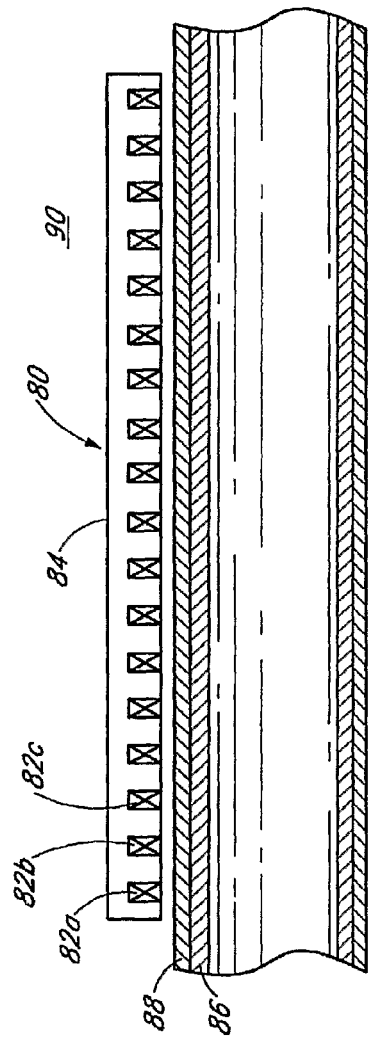

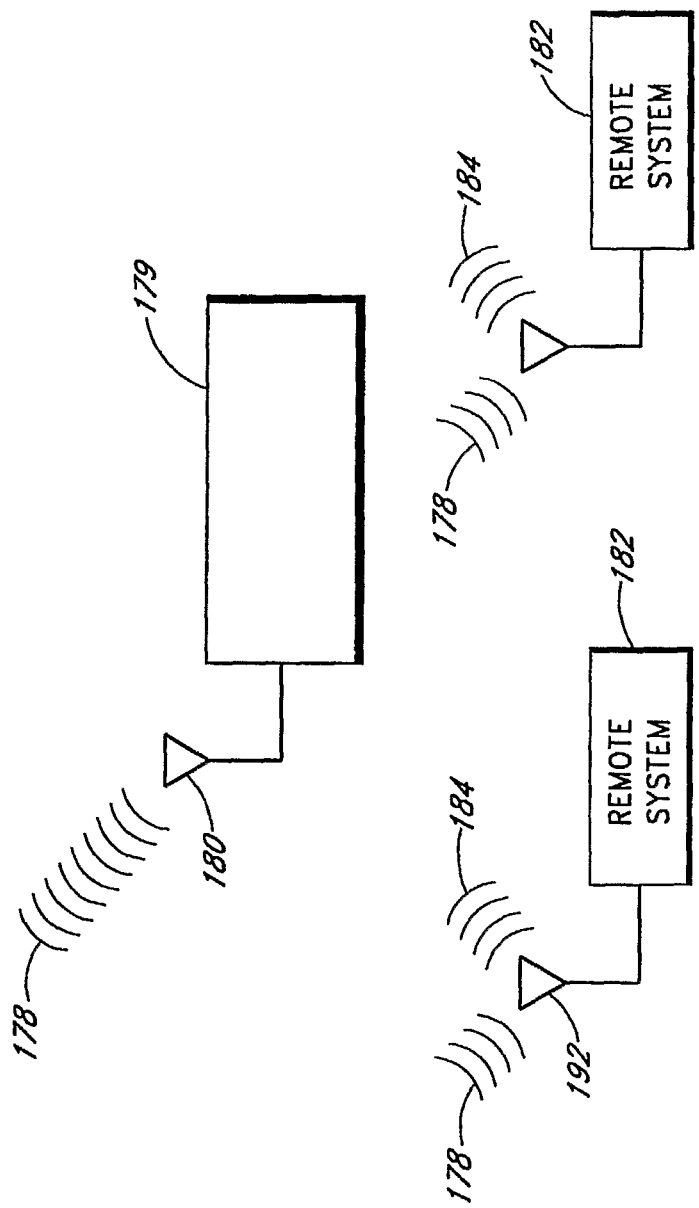

| STATE / POWER / TIME OF REMOTE SYSTEM | | | | | |
|---|---|---|---|---|---|
| STATE | 1 | 2 | 1 | 2 | 1 | 2 |
| POWER USED | ZERO | 2 | ZERO | 2 | ZERO | 2 |
| CUMULATIVE POWER USED | ZERO | 2 | 2 | 4 | 4 | 6 |
| TIME | 12 HOURS | MIN | 12 HOURS | MIN | 12 HOURS | MIN |

KEY : STATE 1 = ZERO POWER (OFF)
STATE 2 = ZERO OPERATIONAL (ON) = 2 POWER UNITS

FIG. 14C

REVERSE OSMOSIS FILTRATION DEVICES WITH RFID TAG-POWERED FLOW AND CONDUCTIVITY METERS

RELATED APPLICATIONS

This application is a U.S. National Phase of International Application No. PCT/US2006/034905, filed Sep. 7, 2006 designating the U.S. and published on Mar. 15, 2007 as WO 2007/030647, which claims the benefit under 35 U.S.C. §119 (e) of U.S. Provisional Application No. 60/714,982, filed Sep. 7, 2005, the entirety of which is hereby incorporated by reference herein.

BACKGROUND OF THE INVENTION

1. Field of the Invention

The present invention relates to reverse osmosis filtration devices, and more particularly, to filtration devices that have flow meters and fluid conductivity meters powered by RFID tags.

2. Description of the Related Art

Reverse osmosis ("RO") filtration systems typically utilize spiral wound membrane filters. Spiral systems are usually staged with three to eight membrane filter devices connected in series within a pressure tube. The filter devices are connected through adapters on permeate tubes. The permeate from each filter device is combined together as a composite solution in the central tube of subsequent filter devices, connected in series, along the pressure vessel. A permeate in each subsequent filter device, located in the direction of the permeate flow, is the composite permeate of the given filter device combined with permeate from filter devices located upstream of it. In a commercial RO unit, a number of pressure vessels are operating in parallel, having feed, concentrate and permeate ports connected together to corresponding manifolds.

The performance of reverse osmosis systems is monitored by collecting information on flows, pressures and conductivities of feeds, permeates and concentrates of individual filters and the whole system. Knowledge of performance of individual filter devices in respect of product flow and product conductivity is of importance for decisions on selection of filter devices for replacement and to evaluate membrane fouling phenomena in the reverse osmosis filtration system. Some information on permeate conductivity produced by individual filter devices can be obtained by so called "probing" of the pressure vessel. During the probing procedure a small diameter tubing is inserted through the permeate port of the pressure vessel and pushed along permeate tubes of connected elements. Permeate samples are collected at predetermined distances and conductivity is measured. These results represent the conductivity of composite permeate at the given location. The results can be associated with individual elements assuming some value for permeate flow of elements that contributed to the composite permeate flow. The calculated permeate conductivity of individual elements is only approximate and frequently incorrect mainly due to an inability to measure permeate flow at the point of water sample collection inside of the permeate tube.

Presently, more accurate information on performance of individual filter devices is only available off line, and filter devices have to be removed from the pressure vessel and tested individually in the single filter device test unit. Such a procedure is disruptive to plant operation and not practical in large plants. Moreover, results obtained in a single filter device test apparatus can not be accurately projected to the fluctuating operating conditions of larger multi-filter device systems.

SUMMARY OF THE INVENTION

Embodiments of the present invention comprise reverse osmosis filters and systems comprising measuring devices, including flow and conductivity meters. The meters of the present invention are preferably located on or within permeate core tubes of filtration devices and systems. Particularly preferred embodiments of the present invention comprise radio frequency identification (RFID) tags that store and transmit data derived from the measuring devices. In preferred embodiments, the RFID tag is activated by an RFID tag reader; the RFID tag is configured to provide power to the measuring devices during such activation. In alternative embodiments, the activated RFID preferably provides power to rechargeable batteries, which provide power to the measuring devices.

An embodiment of a reverse osmosis system for filtering a fluid to obtain a permeate is provided that comprises a membrane filter device comprising a radio frequency identification (RFID) tag and a measuring device configured to measure a value of at least one of the conductivity and the flow of the permeate, the measuring device also configured to transfer information concerning the value to the RFID tag.

In a further embodiment, the measuring device is a fluid flow meter.

In a further embodiment, the fluid flow meter is an electromagnetic flow meter.

In a further embodiment, the fluid flow meter comprises a rotatable member.

In a further embodiment, the fluid flow meter comprises a strain gauge.

In a further embodiment, the fluid flow meter comprises an ultrasonic flow meter.

In a further embodiment, the measuring device is a fluid conductivity meter.

In a further embodiment, the fluid conductivity meter comprises an electrode.

In a further embodiment, the fluid conductivity meter comprises an electrodeless device.

In a further embodiment, the measuring device is powered by the RFID tag.

In a further embodiment, the measuring device is powered by a battery.

In a further embodiment, the battery is rechargeable.

In a further embodiment, the battery is recharged by the RFID tag.

In a further embodiment, the measuring device is powered by an external activated radio frequency energy source.

In a further embodiment, the membrane filter device is a spiral wound membrane filter device.

In a further embodiment, the RFID tag stores the measured value.

In a further embodiment, the reverse osmosis system further comprises a data retrieval device configured to communicate with the RFID tag.

In a further embodiment, the measured value is transferred to the data retrieval device via communication with the RFID tag.

In a further embodiment, the data retrieval device is configured to use the measured value to calculate a value indicative of the performance of the membrane filter device.

In a further embodiment, the calculated value is a normalized salt passage percentage.

In a further embodiment, the calculated value is a normalized total dissolved solids passage percentage.

In a further embodiment, the RFID tag is configured to store a preloaded value relating to the membrane filter device.

In a further embodiment, the preloaded value is selected from a lot number, production data, and shipping data.

In a further embodiment, the preloaded value and the measured value are transferred to the data retrieval device via communication with the RFID tag, and the data retrieval device is configured to use the preloaded value and the measured value to calculate a value indicative of the performance of the membrane filter device.

An embodiment of a method for monitoring performance of a membrane filter device is provided that comprises: measuring a value of at least one of the conductivity and the flow of permeate through the filter device; transferring information concerning the value to an RFID tag mounted on the filter device; and remotely receiving information from the RFID tag.

In a further embodiment, the method further comprises calculating a value indicative of the performance of the membrane filter device from the information.

In a further embodiment, the calculated value is a normalized salt passage percentage.

In a further embodiment, the calculated value is a normalized total dissolved solids passage percentage.

In a further embodiment, the method further comprises: storing a preloaded value relating to the membrane filter device in the RFID tag; and calculating a value indicative of the performance of the membrane filter device from the information concerning the measured value and the preloaded value.

DESCRIPTION OF THE DRAWINGS

FIGS. 5A and 5B show a sectional view of a fluid flow monitoring device in accordance with an embodiment of the invention, in elevation and side views.

FIG. 6 shows a longitudinal sectional view of an induction fluid flow monitoring device in accordance with an embodiment of the invention.

FIG. 13 shows a schematic diagram of a system employing RFID signals for communication in accordance with an embodiment of the invention.

FIG. 14C shows the relative power consumption during the zero power state and an operation state of the remote systems in accordance with an embodiment of the invention.

DETAILED DESCRIPTION OF THE PREFERRED EMBODIMENTS

Figure 1:
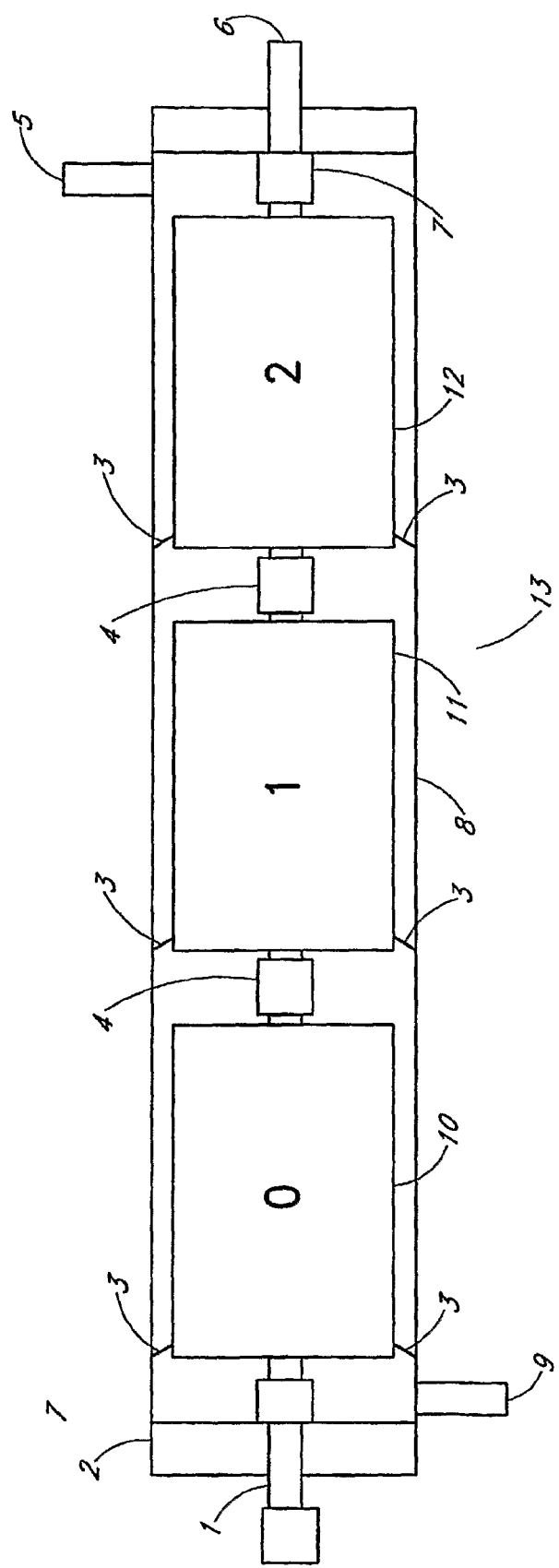
FIG. 1 shows a side view of a RO filter system in accordance with the present invention.

Embodiments of the present invention comprise reverse osmosis filters and systems comprising measuring devices. Real time measurements of salinity and permeate flow of individual filter devices, during reverse osmosis operations, provide many benefits over prior art methods of "probing" of the pressure vessels.

Such measuring devices preferably include, but are not limited to, fluid flow meters and fluid conductivity meters. The flow meters of the present invention are preferably located outside of the permeate core tubes and connecting tubes of filtration devices and systems. Electromagnetic flow meters are preferably used to measure the flow rate of fluids. Alternate embodiments of the flow meters comprise rotatable members. Other embodiments of the flow meters comprise stress or strain gauges. Further embodiments comprise ultrasonic flow meters. The conductivity meters preferably comprise electrodes located within the permeate core tubes and connecting tubes of filtration devices and systems. In alternate embodiments of the present invention, flow conductivity can be measured without the use of electrodes.

While some embodiments of the present device comprise a single flow meter or single conductivity meter, particularly preferred embodiments comprise various combinations of flow meters and conductivity meters. Preferred embodiments of the present invention comprise a plurality of flow meters and conductivity meters.

The measuring devices of the present invention are preferably powered by radio frequency identification (RFID) tags. The RFID tags of the present invention are preferably activated by electromagnetic energy emitted by devices that retrieve information from RFID tags. When activated, the RFID tags preferably transmit power to the measuring devices, which take their measurements. In particularly preferred embodiments, the data is stored in the RFID tags, which may be instantaneously and/or later retrieved. Retrieval may be accomplished by a data retrieval device, such as a computing device, as described hereinbelow. In other preferred embodiments, the measuring devices are powered by rechargeable batteries. For example, such batteries include, but are not limited to, nickel cadmium batteries, lithium ion batteries, and other batteries known to those skilled in the art. In preferred embodiments the batteries may be recharged by energy transmitted from activated RFID tags. In other preferred embodiments of the present invention, the measuring devices of the present invention may be activated radio frequency (RF) energy from an outside source. Further embodiments of the present invention comprise measuring devices which are powered by magnetic energy, electromagnetic energy, or other forms of energy known to those skilled in the art.

Embodiments of the present invention comprise reverse osmosis desalination systems comprising spiral wound membrane filter devices. Spiral wound membrane reverse osmosis devices are disclosed in U.S. Pat. Nos. 3,417,870; 3,554,378; 4,235,723; 4,855,058; and U.S. patent application Ser. No. 10/795,138, each of which is hereby incorporated in its entirety by reference.

In a spiral wound reverse osmosis membrane filter device two flat sheets of membrane are separated with a permeate collector channel material to form a leaf. This membrane assembly is sealed on three sides with the fourth side left open for permeate to exit. A feed/brine spacer material sheet is added to the leaf assembly. A number of these assemblies or leaves are wound around a central plastic permeate tube. This central tube is perforated to collect permeate from the multiple leaf assemblies. The typical industrial spiral wound membrane element is approximately 100 or 150 cm (40 or 60 inches) long and 10 or 20 cm (4 or 8) inches in diameter. The feed/brine flow through the element is in a straight axial path from the feed end to the opposite brine end, running parallel to the membrane surface.

At the time of manufacture, a data storage device such as an RFID tag may be mounted on the membrane filter device, and data relating to the manufacture and initial performance of the membrane filter device may be stored therein. These data may include, for example, lot numbers, production data, shipping data, or performance data such as salt passage percentages.

A fraction of the feed water, as it flows across the filter devices, permeates through the membrane, inside to the membrane envelope. The flow inside the envelope follows the spiral path of the permeate channel, inside the membrane leaf, to the central permeate tube.

As described above, spiral systems are staged with three to eight membrane filter devices connected in series within a pressure tube. FIG. 1 shows such a system 13 that comprises three membrane filter devices 10, 11, and 12. The filter devices are connected by interconnectors 4. The feed stream enters the vessel through a feed port 9 and leaves through the concentrate port 5. Permeate leaves the vessel through permeate port 6. The brine stream from the first filter device is forced to flow to the following filter device, and so on for each filter device within the pressure tube. Bypass flow is prevented by brine seals 3. The brine stream from the last filter device 12 exits the pressure tube as a concentrate at the permeate port 5. The other permeate port 1 is closed with a cup. The last and first filter elements are connected to the pressure vessel end plates through adaptors 7.

The permeate from each filter device is combined together, as a composite solution, in the central tube of subsequent filter devices, connected in series, along the pressure vessel 8. A permeate in each subsequent filter device, located in the direction of the permeate flow, is the composite permeate of the given filter device combined with permeate from filter devices located upstream of it. The ion composition of the permeate is a composite concentration, formed in the same manner. For example, permeate produced in the first filter device 10 flows into the permeate tube of the second filter device 11 and combines with permeate produced in the second filter device 11. This combined permeate flows into the permeate tube of the third filter device 12 and forms a composite permeate with permeate produced in the third filter device 12. This process continues until the combined permeate from all of the filter devices leaves the pressure vessel 8 through the permeate port 5 as a single stream. In a commercial reverse osmosis unit, a plurality of pressure vessels preferably operate in parallel, having feed, concentrate and permeate ports connected together to corresponding manifolds. The performance of reverse osmosis systems is typically monitored by collecting information on flows, pressures and conductivities of feed, permeate and concentrate of a membrane stage or a reverse osmosis train. The measurements of permeate flow are related to the combined permeate produced by all of the filter devices in the reverse osmosis unit. Furthermore, permeate conductivity can be measured from each individual pressure vessel. Knowledge of performance of individual filter devices with respect to product flow and product conductivity is of importance for decisions on selection of elements for replacement and to evaluate membrane fouling phenomena in the RO system.

For example, a pressure vessel operating on seawater feed of 34000 ppm total dissolved solids (TDS) at 50% recovery will produce a permeate of combined salinity of 370 ppm. Determination of permeate salinity along the pressure tube conducted by probing could provide the following results:

|  | Element position | | | | | | | |
|---|---|---|---|---|---|---|---|---|
|  | 1 | 2 | 3 | 4 | 5 | 6 | 7 | 8 |
| Permeate salinity, ppm TDS | 148 | 171 | 196 | 225 | 256 | 291 | 328 | 370 |

The measurements could be conducted from samples collected at the position corresponding to end of each individual filter device, while permeate flows in the direction from feed to the concentrate. However, without information on actual permeate flow, these results do not enable meaningful estimation of salt passage of individual filter devices. However, if the permeate flow of individual filter devices can be measured, then salt passage of individual elements can be calculated applying equations for mass balance:

|  | Element position | | | | | | | |
|---|---|---|---|---|---|---|---|---|
|  | 1 | 2 | 3 | 4 | 5 | 6 | 7 | 8 |
| Permeate salinity, ppm TDS | 148 | 171 | 196 | 225 | 256 | 291 | 328 | 370 |
| Permeate flow, gpm | 3.91 | 3.31 | 2.75 | 2.23 | 1.79 | 1.43 | 1.14 | 0.83 |
| Salt passage, % | 0.41 | 0.49 | 0.58 | 0.71 | 0.86 | 1.08 | 1.32 | 1.82 |
| Normalized salt passage, % | 0.41 | 0.41 | 0.41 | 0.41 | 0.39 | 0.39 | 0.39 | 0.39 |

The above determination requires measurement of salinity or TDS and permeate flow of individual elements, while they are in operation in the reverse osmosis system.

Preferred embodiments of the present invention allow real time measurements using conductivity and flow measuring devices that are preferably mounted in the permeate tube of individual filter devices; the resulting data are provided to a device, for example a data retrieval device such as those described hereinbelow, which calculates the values set forth above.

Furthermore, the data obtained by the devices described above may be transferred by any method or protocol known to those of skill in the art, including Wi-Fi (802.11), cellular, infrared, Bluetooth, or satellite communications.

As described above, the transmitted data are then used to calculate permeate salinity or TDS at individual filter elements along the pressure vessel using mass balance equations. Such equations are well known to those of skill in the art, and are disclosed in, for example, "Transport Phenomena", 2nd ed., R. B. Bird, W. E. Stewart and E. N. Lightfoot, John Wiley, New York 2001, which is incorporated here by reference. The construction of a device to perform such calculations is well within the ability of one of ordinary skill in the art and may employ, for example, integrated circuits.

The calculated values are then used to monitor performance of the individual elements of the RO system. For example, if the normalized salt passage value for one filter device becomes anomalous, an error message could be sent to an operator indicating that the device should be exchanged. The preloaded data may also be used in this monitoring process. For example, the calculated performance value could be compared to the stored initial performance values, and significant deviations therefrom could be flagged. Alternatively, the date of production could be used to weight the monitoring, so that, for example, older units would be more likely to be identified for exchange.

Hereinbelow, the devices used to obtain the data relating to salinity or TDS and flow rate that are used to calculate the values described above will be discussed.

Conductivity Measurement

Preferred embodiments of the present invention comprise measuring devices which monitor the electrical properties of a liquid. The operation of devices that measure water conductivity are preferably based on measurement of liquid resistivity between two electrodes. A device that measures current flow between at least two electrodes can preferably be located on or within in a core tube of a reverse osmosis filter device and/or system. Examples of such devices are disclosed in U.S. Pat. Nos. 3,867,688, and 4,132,944, which are hereby incorporated in their entirety by reference. Electric energy required to power such devices can be supplied by radio frequency radiation, a rechargeable battery, power transferred from an RFID tag, electromagnetic energy, or other forms of energy known to those skilled in the art.

Figure 2B:
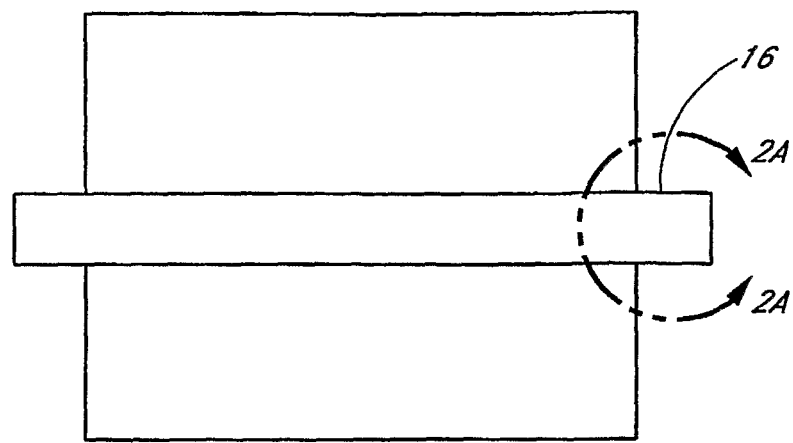
FIGS. 2A and 2B show an end view and a side view of an individual filter device.
Figure 2A:
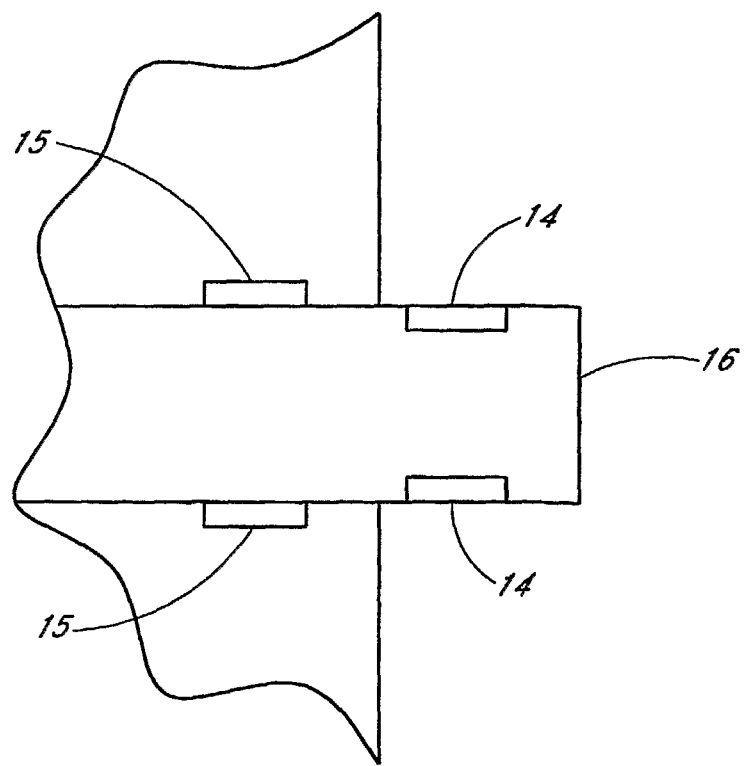

The liquid sensing probe of the preferred embodiments consists of a conductivity cell which has an integrally mounted thermocouple. As shown in FIGS. 2A and 2B, the electrodes 14 of the conductivity measuring device may in some embodiments be installed on the inside walls of the permeate tube 16. When the conductivity cell is connected across an a.c. sine wave excitation source, the resulting current is proportional to the cell admittance. This current is resolved into two orthogonal components: a charging current which leads the excitation voltage by 90° and is proportional to the dielectric constant (k) of the liquid between the electrodes of the conductivity cell, and an ohmic current which is in phase with the excitation voltage and is proportional to the reciprocal of the resistance, or conductance, of the liquid.

Temperature compensation for the real component of the admittance (conductance) can be based on the Arrhenius absolute rate model. Accordingly, conductance is preferably a function of the thermal energy (RT), and the activation energy $\Delta E^{\neq}$ which separates equilibrium positions of the conducting species. The conductance G at a process temperature T may be corrected to a conductance $G_o$ at the reference temperature $T_o$ by the equation:

$$G_o = G 10^{b(T_o-T)}$$

or, $$\log G_o = \log G + b(T_o - T)$$

where:
$b = \Delta E^{\neq}/[2.303 \, R \, T_{ok}^2]$, in which
$\Delta E^{\neq}$ = activation energy in calories/mole
R = the gas constant in calories/(mole °K.), and
$T_{ok} = T_o$ in degrees Kelvin The thermocouple embedded in the probe produces a signal proportional to the process liquid temperature T, while constant signals analogous to the reference temperature $T_o$ and to b are generated by appropriate circuitry. These analog signals proportional to T, $T_o$ and b, are combined to form a signal representing the expression $b(T_o-T)$. The log G function is generated from the signal representative of the conductance G, added to the signal representing $b(T_o-T)$, and sent to an antilog amplifier, whose output signal is representative of the desired conductance value $G_o$ of the liquid.

The imaginary component of the admittance when divided by the excitation frequency in radians per second is the capacitance C of the liquid at the processing temperature T. Based on the simple volume expansion for the liquid and the Debye model for dilute solutions of polar molecules, the temperature dependence of the dielectric constant k of the liquid takes the form $$k = k_o - \alpha(T-T_o),$$

as reported in the National Bureau of Standards circular 514. In terms of measured capacitance, $$C_o = C - aC(T_o - T),$$

where $C_o$ is the capacitance of the liquid at the reference temperature $T_o$, $K_o$ is the dielectric constant of the liquid at the reference temperature $T_o$, $\alpha$ is the volume expansion coefficient, and $a = \alpha/K_o$.

This equation assumes that the capacitance $C'_o$ of the cell in air at the reference temperature $T_o$ is approximately equal to the capacitance C of the liquid at the measured process temperature T divided by the dielectric constant k of the liquid at the process temperature T. This assumption was made to allow the use of different conductivity cells having different $C'_o$ values, without changing any of the circuit values, and is accurate so long as the dielectric constant variation with temperature is no more than plus or minus ten percent, which is the case for water at the temperatures and pressures normally found in RO filtration systems.

A signal proportional to $a(T_o-T)$ is generated by the same method used to form the $b(T_o-T)$ term in the conductance compensation circuit. The signal proportional to the capacitance C of the liquid and the signal proportional to $a(T_o-T)$ are supplied to an analog multiplier which generates an a signal proportional to the product of these two signals, $aC(T_o-T)$. This product signal is then electrically subtracted from the capacitance signal C to produce a signal proportional to the capacitance $C_o$ of the liquid at the reference temperature $T_o$.

Figure 3:
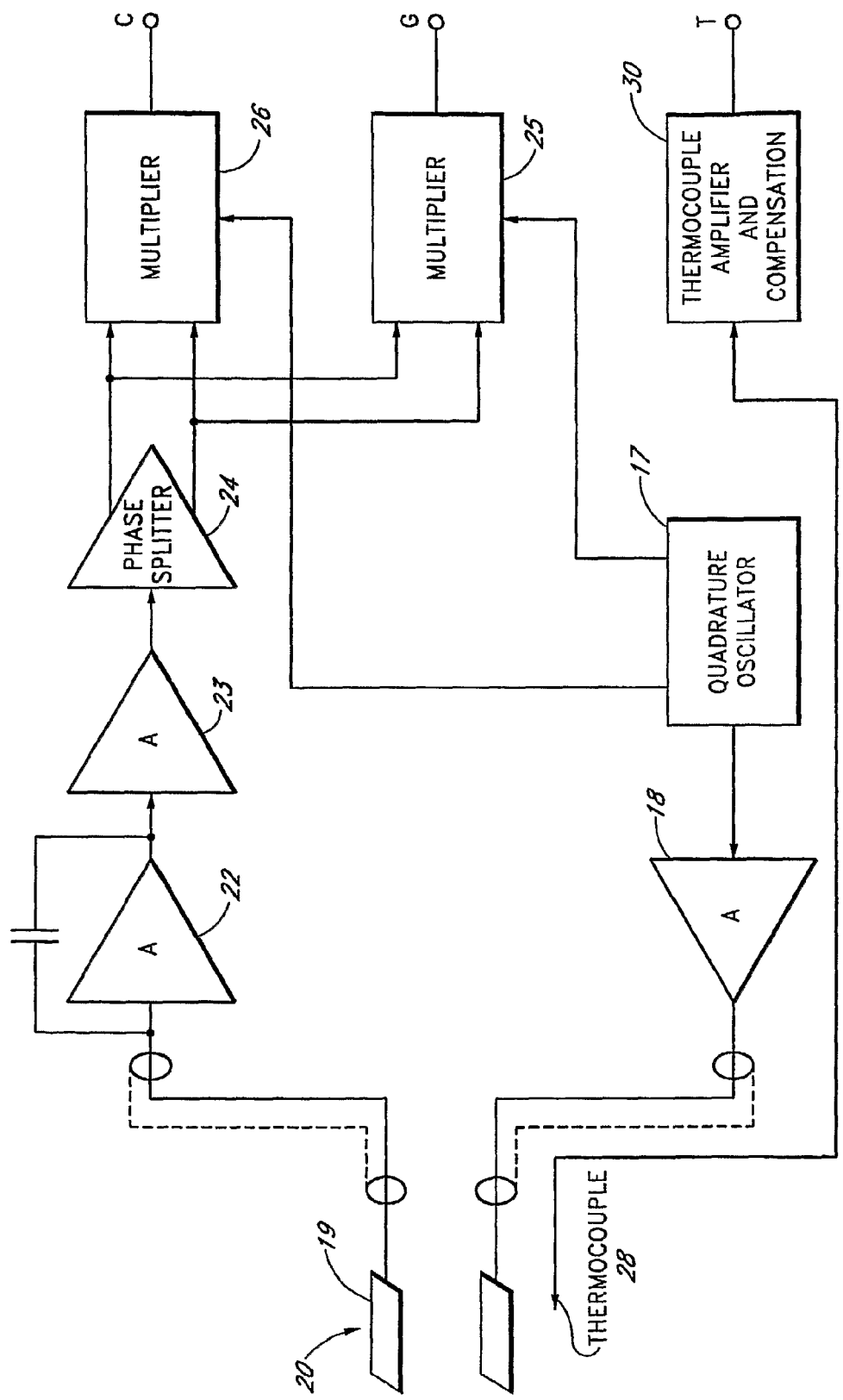
FIG. 3 shows a schematic block diagram of a liquid sensing probe in accordance with an embodiment of the invention.

For example, in one preferred embodiment of the present invention, as shown in FIG. 3, a quadrature oscillator 17 generates a 1000 Hz sine wave voltage, which is amplified by an amplifier 18 and applied to a conductivity cell 19 of the liquid sensor probe 20 immersed in the liquid being processed. The current flowing through the conductivity cell 19 is converted into a proportional voltage by a current transducer 22, and amplified by a narrow band amplifier 23. This amplified voltage signal is then divided into two signals of opposite polarity by the phase splitter 24, which are supplied to respective circuits of a first multiplier 25 and a second multiplier 26.

In the first multiplier 25, the phase splitter output signals are preferably multiplied by a square wave voltage signal generated by the quadrature oscillator 17 which is in phase with the voltage applied across the conductivity cell 19, to produce an output signal proportional to the real component of the current flowing through the conductivity cell 19, and thus proportional to the conductance G of the liquid.

In the second multiplier 26, the phase splitter signals are preferably multiplied by a second square wave voltage signal, generated by the quadrature oscillator 17, which is 90° out-of-phase with the voltage applied across the conductivity cell 19, to produce an output signal proportional to the imaginary component of the current flowing through liquid in the conductivity cell 19, and thus proportional to the capacitance C of the liquid at its processing temperature T.

The liquid sensor probe also preferably includes a thermocouple 28 embedded in it, which produces a signal proportional to the temperature of the liquid at the probe 20. This temperature signal is amplified, and made linear with temperature in an amplifier and compensation circuit 30.

Figure 4:
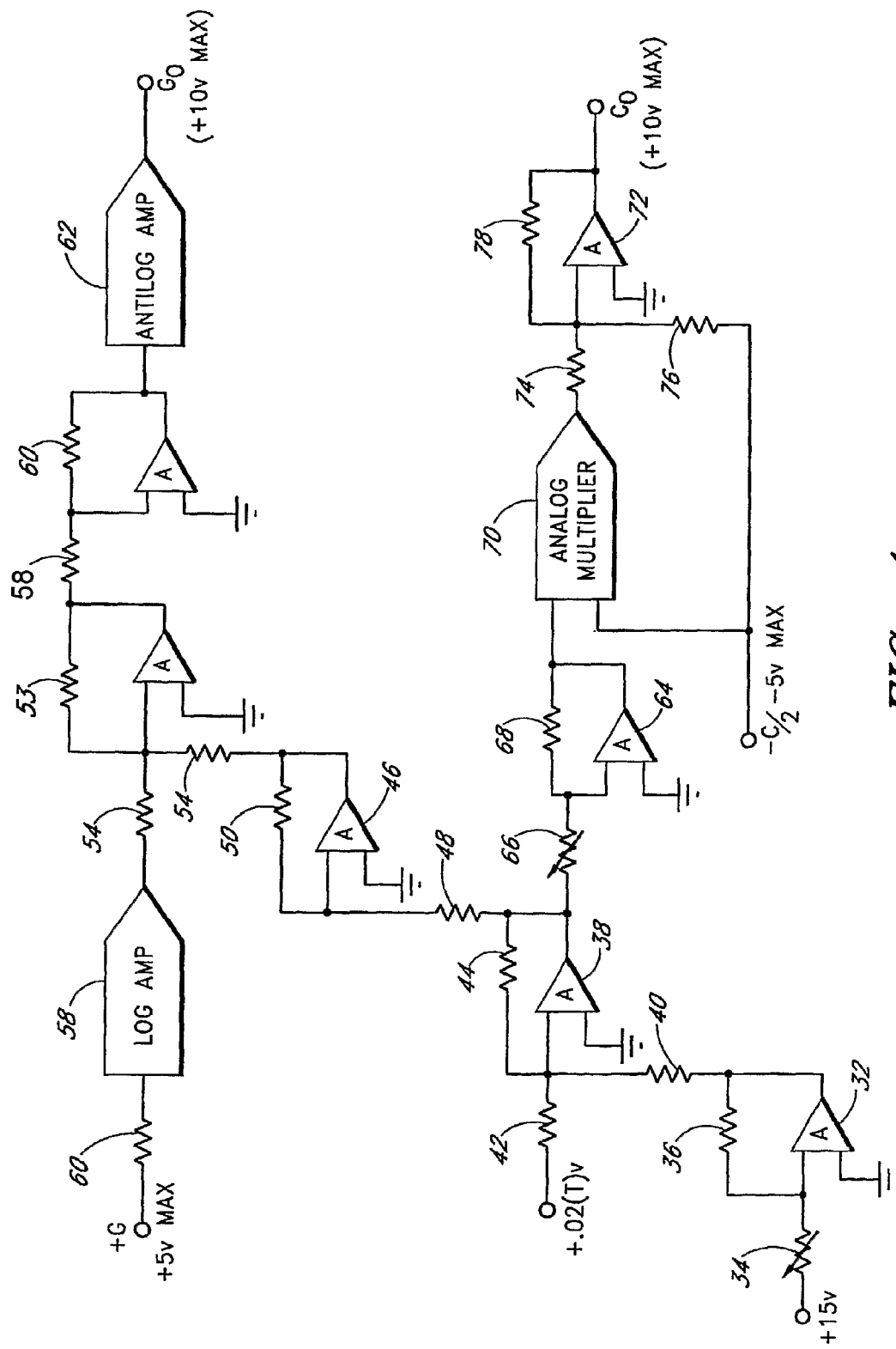
FIG. 4 shows a schematic diagram of temperature compensation circuits of a liquid sensing probe in accordance with an embodiment of the invention.

In preferred embodiments, this compensated temperature signal is directly proportional to the liquid process temperature T, and is utilized in the temperature compensation circuits of FIG. 4, together with a signal proportional to the reference temperature $T_o$, to convert the signals proportional to the conductance G and the capacitance C of the liquid at the measured temperature T to respective signals proportional to the conductance $G_o$ and the capacitance $C_o$ of the liquid at the reference temperature $T_o$. In most applications of this monitoring apparatus, the reference temperature $T_o$ is selected to be about the average temperature of the liquid during the processing operation, so that temperature compensation is only made over the range from the highest to the lowest temperature of the liquid during the processing operation.

Referring to FIG. 4, an amplifier 32 is preferably used to produce a signal proportional to the reference temperature $T_o$, from which the signal proportional to the process liquid temperature T can be electrically subtracted. An input of the amplifier 32 is connected to a positive voltage source through the reference voltage resistor 34, and a feedback resistor 36 is connected between the input and the output of the amplifier and is directly proportional to the reference temperature $T_o$, the value of the reference temperature resistor 34 is inversely proportional to the reference temperature $T_o$, and can be a variable resistor, to allow selection of the reference temperature $T_o$. Also, since the output signal from the amplifier 32 must be equal to the output temperature signal from the thermocouple amplifier at the selected temperature $T_o$, the value of the feedback resistor 36 is determined by the signal characteristics of the thermocouple amplifier 30. Assuming the voltage output signal of the thermocouple amplifier 30 is 10 volts at 500° C., and varies with the temperature T at a rate of 0.02 volts per degree C., the output voltage signal of the reference temperature amplifier 32 is preferably proportional to 0.02 ($-T_o$) volts. Thus, if the positive voltage source is 15 volts, and the value of the temperature resistance 34 is selected to equal $1/T_o \times 10^7$ ohms, the value of the feedback resistor 36 is preferably approximately 13,300 ohms (13.3 K) to produce an output signal of 0.02 ($-T_o$) volts.

This 0.02 ($-T_o$) voltage signal is preferably supplied to an input of a summing amplifier 38 through a 10K resistor 40, and the 0.02 (T) voltage signal from the thermocouple amplifier 30 is also supplied to the same input of the amplifier through another 10K resistor 42. A 100K feedback resistor 44 is connected between the input and the output of the amplifier 38, to produce an output temperature compensation signal of 0.2 ($T_o-T$) volts, which is supplied to both the conductance and capacitance compensation circuits. When the measured liquid temperature T is equal to the reference temperature $T_o$, there will be no temperature compensation signal.

This 0.2 ($T_o-T$) temperature compensation signal is preferably supplied to an input of the amplifier 46 through a conductance compensation resistor 48, having a value of $1/b \times 10^2$ ohms, which may be a variable resistor to allow this apparatus to be used with different liquids having different "b" values. A 10K feedback resistor 50 is preferably connected between its input and output. The output of the amplifier 46, representing 20b($T_o-T$), is supplied to an input of the summing amplifier 52 through a 200K scaling resistor 54.

The output signal from the first multiplier 25, which is proportional to the liquid conductance G, is preferably supplied to the input of a log amplifier 58 through a resistor 60. Assuming that the maximum value of this conductance signal is +5 volts full scale, the resistor 60 can be selected to have an ohmic value of 50K, to thus allow a maximum input current of 100 μA to the log amplifier 58, and the log amplifier 58 selected to have a transfer function of μ log (Amperes input current/100 μA), so that the voltage output of the log amplifier 58 will preferably be −log G volts.

In preferred embodiments, this −log G signal is also supplied to the input of the summing amplifier 52 through a 10K resistor 54, to produce an output signal of log G+b ($T_o-T$) volts or log $G_o$ volts, since, as discussed earlier, log $G_o$=log G+b ($T_o-T$). This log $G_o$ voltage signal is preferably supplied to an input of an amplifier 56 through a 10K resistor 58, and a 10K feedback resistor 60 is connected between this input and the output of the amplifier 56, to invert the input signal and produce an output signal from the amplifier 56 of −log $G_o$ volts. This −log $G_o$ signal is then supplied to the input of antilog amplifier 62 having a transfer function of $10 \times 10^{-x}$, where x is the input signal, to produce an output signal of 0 to 10 volts that is directly proportional to the conductance $G_o$ of the liquid.

In this embodiment, the maximum value of the capacitance signal from the second multiplier 26 is −5 volts, and since a full scale positive output of 10 volts proportional to the capacitance $C_o$ of the liquid is desired, the input signal from the second multiplier 26 is shown as −C/2 volts.

The 0.2 ($T_o-T$) volt temperature compensation signal from the amplifier 38 is also supplied to an input of another amplifier 64 through a capacitance compensation resistor 66, having an ohmic value of $1/a \times 10^2$. This capacitance compensation resistor 66 can be a variable resistor, which can be adjusted for use with different liquids having different "a" values. A 5K amplifier feedback resistor 68 is preferably connected between the input and the output of the other amplifier 64, to produce an output signal of that amplifier of −10 [a ($T_o-T$)] volts, which is supplied to a first input of an analog multiplier 70. The −C/2 volt signal from the second multiplier 26 is supplied to a second input of the analog multiplier 70. The analog multiplier 70 has a transfer function of one-tenth of the product of the two input signals, to produce an output signal of a ($T_o-T$) C/2 volts. This output signal of the analog multiplier is supplied to an input of a summing amplifier 72 through a 10K resistor 74. The −C/2 volt signal from the second multiplier 26 is also supplied to the same input of the amplifier 72 through a 10K resistor 76. A 20K feedback resistor 78 is preferably connected between the input and the output of the amplifier, to produce an output voltage signal proportional to C−aC($T_o$−T), or to the capacitance CO of the liquid, since, as discussed earlier, $C_o$=C−aC ($T_o$−T).

In a preferred embodiment, a relatively high frequency of 1000 Hz is selected for the voltage applied across the electrodes of the conductivity cell to reduce the effects of charge transfer kinetics (Faradaic impedance) and electrode polarization, and to enhance the capacitive coupling of the electrodes with the liquid (double layer capacitance). Also, the operational amplifiers and other electronic components used in this embodiment are readily available commercially at this operating frequency. However, the invention is not limited to this frequency, any frequency within an approximate range of 100 Hz to $10^7$ Hz may be used. Also, the nominal operating temperature range, maximum deviation of the process temperature T from the reference temperature $T_o$, and the maximum absolute signal correction is preferably determined by the choice of circuit components.

In another embodiment, conductance is measured by an electrodeless device. In such a device, noncontact measurement of the conductance of the liquid is obtained by charging a capacitor in series with the primary winding of a first transformer ring core. The capacitor is periodically discharged so that across the primary winding, a damped oscillatory signal is produced as a result of the capacitor, the inductance of the winding, and inherent resistivity. A loop including for at least a portion of its path the liquid acts as a one-turn secondary winding for the first ring core and as a one-turn primary winding for a second transformer ring core. At the instant the discharge is initiated, a constant voltage appears across by loop regardless of the resistance of the loop so that by measuring the peak current in a secondary winding of the second core, which will appear at the initiation of discharge and which corresponds to the current in the loop at the initiation of the discharge, the conductance of the liquid can be determined using Ohm's law.

It should be appreciated that the conductivity measurement described above is not limited to an assessment of the salinity of the liquid passing through the RO filtration device, but may as easily be applied by those of skill in the art to the measurement of TDS.

Additionally, it is not absolutely necessary that the conductance of the liquid be obtained in order to measure salinity or TDS; other means known in the art, such as the density method, or the refractance method, may be employed.

Flow Rate Measurement

Preferred embodiments of the present invention comprise measuring devices which monitor the flow properties of a fluid, in addition to or instead of measuring the conductivity of a fluid. A device that measures fluid flow can preferably be located on or within a core tube of a reverse osmosis filter device and/or system. As shown in FIG. 2A, in some embodiments, the sensing elements 15 of the flow rate measuring device may be located outside the permeate tube 16. Such devices are disclosed in U.S. Pat. Nos. 4,848,164 and 3,714,826, which are hereby incorporated in their entirety by reference. Electric energy required to power such a device can be supplied by radio frequency radiation, a rechargeable battery, power transferred from an RFID tag, electromagnetic energy, or other forms of energy known to those skilled in the art.

(Induction Flow Meter)

In a preferred embodiment, referring to FIGS. 5A and 5B, a flow rate detection unit comprises a pair of magnetic field-generating devices 80 facing each other across the permeate tube so as to generate a magnetic field shifting along the passage of liquid. Each generating device 80 preferably comprises a plurality of (for example, six to eight) three-phase coils 82a, 82b, 82c, . . . received in the slits of an iron core 84. The outer periphery of the permeate tube 86 is preferably covered with a heat insulating layer 88 to prevent temperature rise therein. In alternate embodiments, as shown in FIG. 6, the magnetic field generating device 80 may be disposed only on one side of the permeate tube 86.

Figure 7:
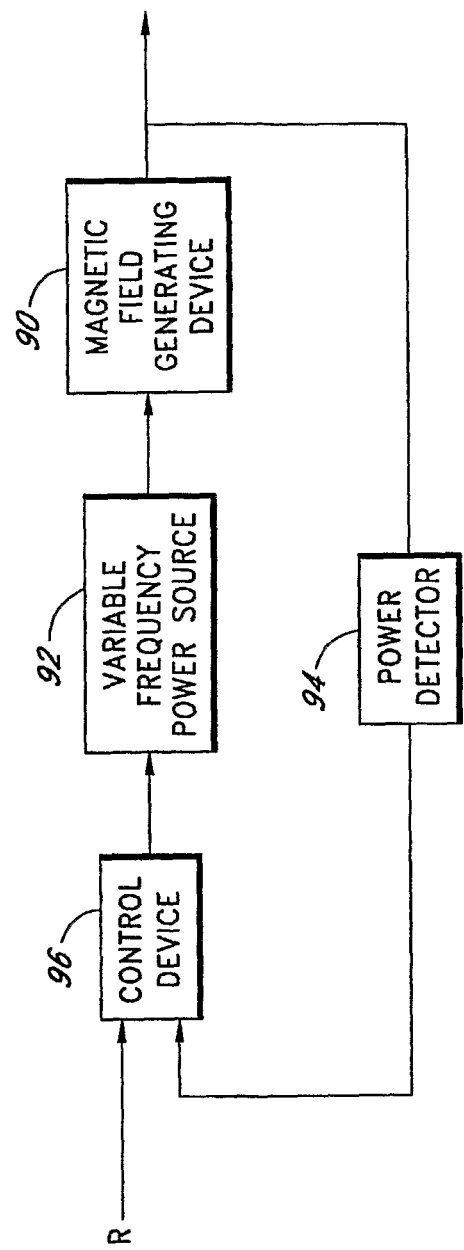
FIG. 7 shows a block circuit diagram of an induction fluid flow monitoring device in accordance with an embodiment of the invention.

In preferred embodiments, as shown in FIG. 7, a variable frequency power source 92 supplies power to the three-phase electromagnetic coils of the flow rate detection unit 90. The power is preferably measured by a watt meter 94 and the measured output is fed back to a control device 96 which is used to control the frequency of the power source 92 by comparing said output fed back thereto with the later described referential value R. The frequency of the power supplied to the magnetic field generating device should preferably be of the order of 5 to 100 Hz. Too high a frequency can result in a narrow magnetic field and in consequence a weak detection output from said generating device, thus presenting difficulties in measuring the flow rate of liquid.

Embodiments of the present invention preferably vary the frequency of the power source 92, detecting the frequency $f_O$ when the power P from said source 92 is reduced to zero and computing the liquid velocity V from said frequency $f_O$. Since it is difficult to realize P=O, in general, the power P is expressed as:

$$P=af^b+Kf^2$$

Here, $af^b$ denotes loss of energy (a and b are constants; b≤2), or the power where no permeate flows through the tube 86. The frequency $f_O$ is detected from the control device 96 and is used in regulating the frequency of the power source 92. The control device 96 may be provided with an operation circuit for computing liquid velocity V from the frequency $f_O$.

The foregoing description relates to the case where the flow rate of liquid was determined by varying the frequency of the power source 92. Where the frequency of the signal supplied to the coil is fixed, the power P may be given as $$P=K_O+K's (K=\text{constant watt})$$

If, therefore, the slip s of the shifting magnetic field is determined for a given liquid velocity V using the following equation $$s=(P-K_O)/K'$$

where P is measured and $K_O$ and K' are constants, then the flow rate of liquid can be computed by determining the liquid velocity V from the equation $$V=fs(1-s)$$

which is derived from the equation $$s=(f-V)/f$$

Figure 8:
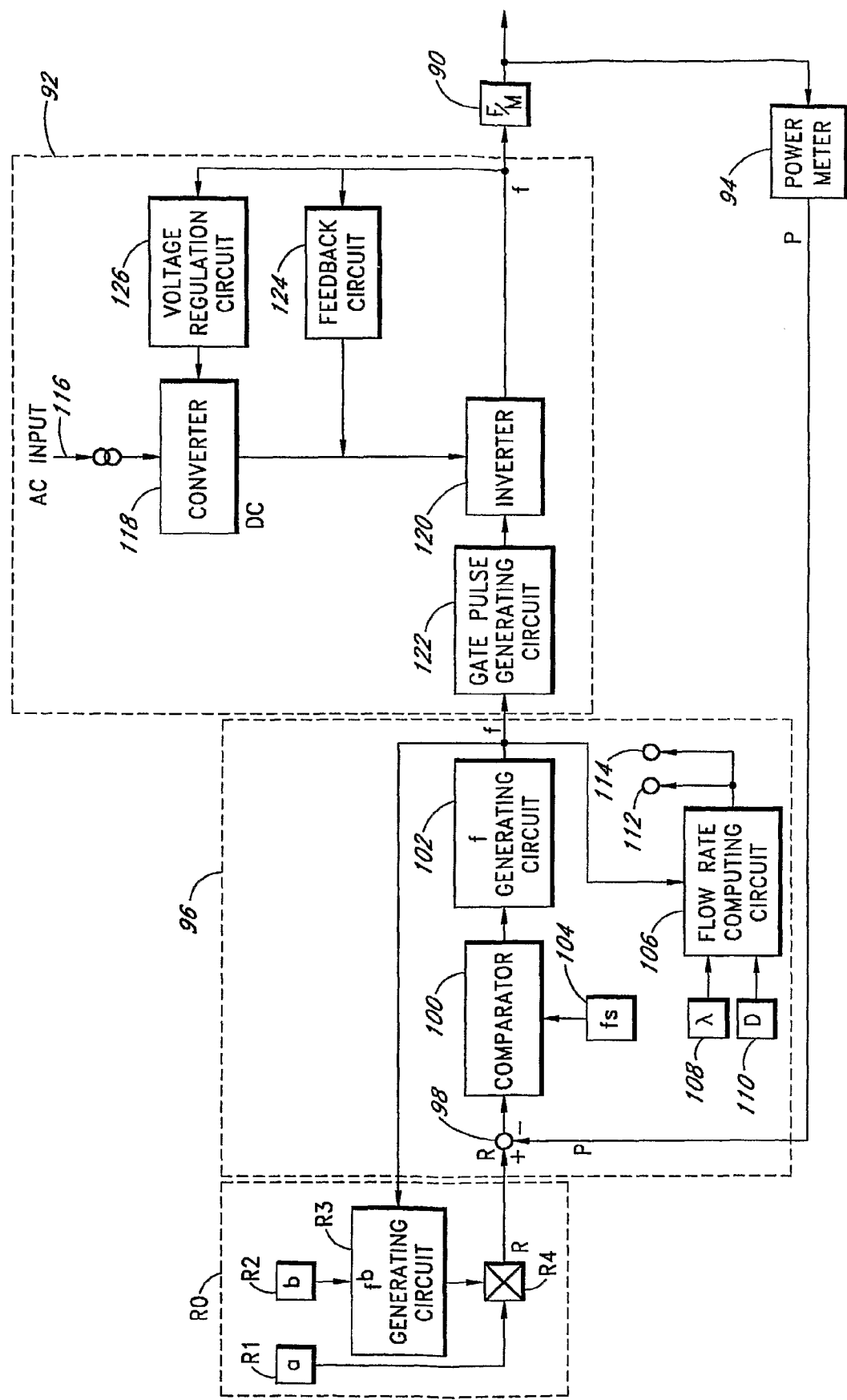
FIG. 8 shows the block circuit diagram of FIG. 7 in greater detail.

As shown in FIG. 8, in a circuit $R_O$ for generating a referential value R, the memory circuits $R_1$ and $R_2$ store constants a and b respectively. Output $f^b$ from a frequency $f^b$ generating circuit $R_3$ is multiplied by the constant a stored in the memory circuit $R_1$ using a multiplier $R_4$. The output from said multiplier $R_4$ forms a referential value R.

Referring to the control device 96, a value P measured by the power meter 94 is composed with the referential value R by a comparator 98. Based on the result of said comparison, another comparator 100 determines whether the frequency f should be increased or decreased. Based on the determination by said another comparator 100, the frequency f of a circuit 102 is increased or decreased. In this case, the increase or decrease of the frequency f of said circuit 102 starts with the constant frequency fs of a constant frequency source 104. The output from the frequency f generating circuit 102 is supplied to the variable frequency power source 92. On the other hand, the output frequency f of said circuit 102 is operated on in a flow rate computing circuit 106 based on the relationship between the constant λ 108 and another constant D 110, both used in determining the flow rate. This operation output is presented by an indicator 112 and recorded by a recorder 114.

Referring to the power source 92, AC input 116 is preferably converted to a DC output by a converter 118. Said DC output is converted to an AC output having a desired frequency by an inverter 120 based on the output from a gate pulse generator 122 for producing gate pulses according to the aforesaid frequency f of the circuit 102. There are further provided a feedback circuit 124 and voltage regulation circuit 126 to reduce the deformation of said AC output. The output from said inverter 120 is supplied to the magnetic field generator device 90. The resulting power is measured by the power meter 94, the measured power P being supplied to the control device 96.

Figure 9:
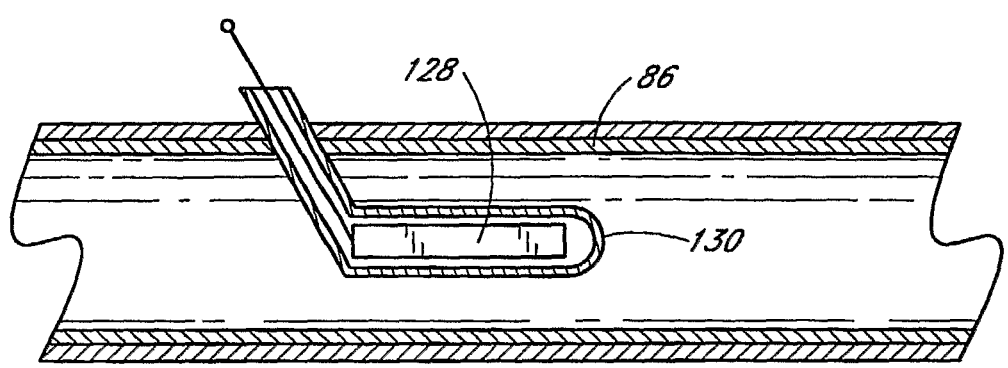
FIG. 9 shows a longitudinal sectional view of an induction fluid flow monitoring device in accordance with another embodiment of the invention.

In another embodiment, as shown in FIG. 9, the magnetic field generating device 128 may be received in a pipe 130 coaxially placed in the permeate tube 86 in a state completely shut off from the interior of the latter. The closed pipe 130 has an opening exposed to the outside of the permeate tube 86, power being supplied to the magnetic field generating device 128 through said opening.

The magnetic field generating device of the present embodiment has essentially the same construction as that used in a linear induction pump. Unlike the pump, however, the flow meter of the present invention causes a shifting magnetic field to be generated simply to determine the velocity of liquid and not to carry forward said liquid, so that it can be made more compact.

For example, one preferred embodiment comprises a round permeate tube, as shown in FIG. 5A. However, the present invention is not limited to a round permeate tube, but permits the use of a flattened, angular or any other form of permeate tube. In addition, while the foregoing embodiments comprise a pair of magnetic field generating devices facing each other across the permeate tube, alternative embodiments can comprise an integral cylindrical body enclosing the permeate tube, or several units arranged lengthwise around the outer periphery of the permeate tube. The magnetic field may be shifted in the same direction as, or in the opposite direction to, that in which the permeate flows.

(Flow Meters Using Rotatable Members)

In another preferred embodiment, the device used to measure fluid flow employs rotatable members. Such devices are disclosed in, for example, U.S. Pat. Nos. 4,306,457; 4,275,291; 4,533,433; and 4,848,164, which are incorporated by reference here in their entirety.

Such liquid flow meters can comprise an impeller or turbine sealably mounted in a liquid flow path, wherein the number of rotations of the impeller or turbine provide a measure of the liquid flow volume therethrough. The liquid flow meters may provide an electrical circuit for detecting the rotation of movement of the impeller or turbine, wherein it is typical to connect a magnetic element to the rotatable shaft and to provide a coil or inductive pickup circuit in proximity to the magnet, wherein the rotating magnet generates varying magnetic fields to influence the circuitry coupled to the pickup, and to thereby generate electrical signals representative of shaft rotation. The electrical signals are subsequently amplified and converted to drive signals for energizing some form of indicating device, such as an RFID tag.

One embodiment comprises a liquid flow meter, wherein a magnet is affixed to the rotatable impeller shaft. A magnetic field sensor, in the form of a ferromagneto resistive circuit, is placed in physical proximity to the rotatable magnet, and the magnetic field induces an electrical signal in the sensor, which signal is amplified and shaped to drive a suitable logic network, the logic network serving to both count the sensed signals and to calculate a corresponding flow volume indication.

Another embodiment of the flow meter utilizes magnets. For example, a first magnet is affixed to the rotatable impeller shaft, and a second magnet is placed in proximity to the first magnet, but outside of the liquid flow chamber. Rotation of the second magnet is induced by the rotating field of the first magnet, and the rotating field generated by the second magnet is detected by an inductive sensor to generate an electrical signal representative of the shaft rotation. The electrical signal is then utilized to drive an indicator circuit to provide a readout of the volume flow detected by the device.

Another embodiment comprises a flow meter utilizing shaft-mounted magnets. For example, a meter has a first magnet attached to a rotor shaft and a second magnet attached to an indicator shaft, the second magnet being rotatably and magnetically coupled to the first magnet, so as to provide corresponding rotation of the indicator shaft when the rotor shaft is rotated by the flow of fluid through the meter housing.

Another embodiment comprises a liquid flow meter of the rotating turbine or impeller type, wherein liquid flow through the meter results in positive rotatable displacement of a shaft made from a nonmagnetic material. A permanent magnet is embedded proximate one end of the shaft, and the impeller end shaft is rotatably mounted in a housing made from nonmagnetic materials. A magnetically-operated reed switch is positioned outside the housing proximate the shaft end embedding the permanent magnet, and each complete revolution of the shaft causes two magnetically-induced closures of the reed switch. The reed switch is electrically coupled to a battery-operated logic circuit, including counters and an electronic readout, so that switch closures of the reed switch are converted into flow volume data provided to an RFID tag, for example.

The internal design of the rotatable impeller and flow meter cavity are controlled to provide predetermined volumetric displacement characteristics, wherein each revolution of the impeller is matched to the logic circuit so as to provide a predetermined fractional relationship between the liquid flow volume passed during a single revolution of the shaft and the unit of measure in which the logic circuit and display are adapted to count and display units. The unit of measurement may therefore be modified by merely changing one linear dimension of the rotatable turbine or impeller.

(Stress or Strain Gauge Flow Meters)

In another preferred embodiment, the device used to measure fluid flow is a stress or strain gauge flow meter. Such a flow meter is disclosed in, for example, U.S. Pat. Nos. 5,036,712 and 4,848,926, which are incorporated by reference here in their entireties.

A strain gauge flow meter in accordance with this embodiment employs a monitoring assembly comprising a resilient, flexible strip, for example a reed, which is supported by the wall of the permeate tube in such a manner as to project into the flow path of the permeate within the tube. The permeate flowing within the tube preferentially impacts against one wide side of the strip. A strain gauge is fastened to the wide side of the strip against which the permeate flow impacts. The strain gauge is provided with output conductors which extend to the outside of the permeate tube. A temperature monitoring device such as a thermocouple or a resistance temperature detector is mounted to the distal end of the strip within the permeate tube. This device is also provided with output conductors which extend to the outside of the permeate tube.

When permeate flows within the permeate tube, the temperature monitoring device directly monitors the temperature of the permeate. At the same time, the permeate impacting on the free distal end of the strip deflects that end in a downstream direction, imposing a tensile stress on the strain gauge. As a result, the strain gauge produces an output signal indicative of the degree of deflection of the strip, and thus of the rate of flow of the permeate.

The material and dimensions of the strip will be appropriately selected, based on principles well known in the art, and taking into account the characteristics of the strain gauge, to ensure that the range of flow rate values to which the monitor is to respond will impose a suitable level of stress on the gauge. In an embodiment in which the strain gauge flow meter is employed, the flow rate of the permeate is preferably 5-70 liters/minute, and more preferably 10-30 liters/minute, although flow rates outside these ranges are also contemplated.

It is preferred that the material of the strip have a low coefficient of thermal expansion and a high degree of resiliency. Since the temperature monitoring device is disposed directly in the permeate flow path, it will provide an accurate temperature indication, while the mounting of the temperature monitoring device on the end of the strip results in the monitoring of temperature and flow rate at the same location along the flow path.

Thus, the unit simultaneously provides information regarding temperature and flow rate, so that if an abnormal temperature reading should be produced, a direct determination will be provided of whether this abnormal reading is associated with a blockage of the permeate flow path.

(Ultrasonic Flow Meters)

In another preferred embodiment of the present invention, the device used to measure fluid flow is an ultrasonic flow meter. Such a meter is disclosed in, for example, U.S. Pat. No. 6,748,811, which is incorporated by reference here in its entirety.

Figure 10:
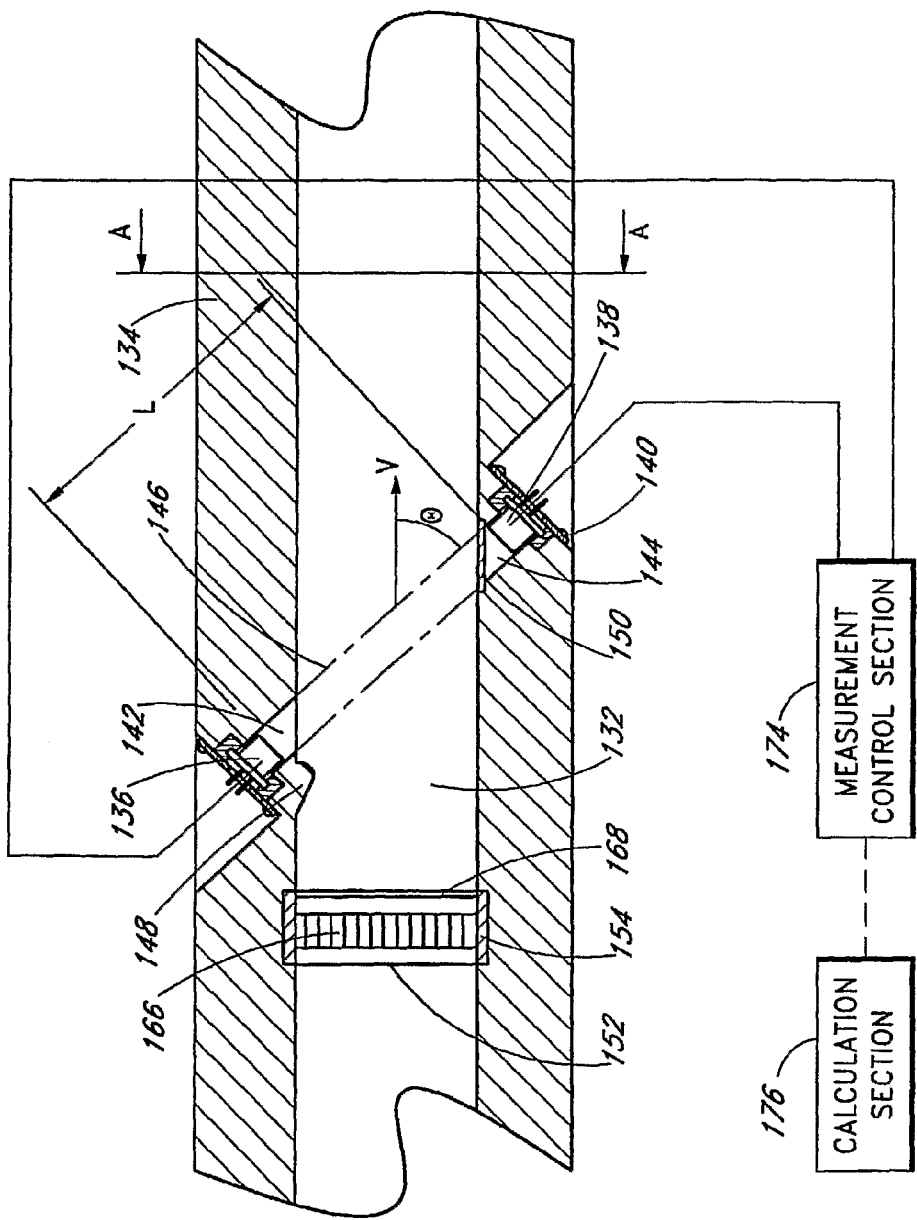
FIG. 10 shows a sectional view of an ultrasonic fluid flow monitoring device in accordance with an embodiment of the invention.

As shown in FIG. 10, an ultrasonic flow meter according to an embodiment of the present invention incorporates a measurement flow path 132 surrounded by a flow path wall (permeate tube) 134, and upstream and downstream ultrasonic transducers 136 and 138 attached to the flow path wall 134 via a vibration conduction suppressor 140 so as to oppose each other. The upstream ultrasonic transducer 136 and the downstream ultrasonic transducer 138 are spaced from each other by a distance L and inclined by an angle θ with respect to the flow direction of the measurement flow path 132. Upstream and downstream aperture holes 142 and 144 are provided for exposing the ultrasonic transducers 136 and 138 to the measurement flow path 132. The aperture holes 142 and 144 are each provided in the form of a depression in the flow path wall 134. An ultrasonic wave propagation path 146 is provided along which an ultrasonic wave transmitted from one of the ultrasonic transducers 136 or 138 opposing each other is propagated directly to the other one of the ultrasonic transducers 138 or 136 without being reflected by the wall surface. A first influent suppressor 148 is provided for the upstream aperture hole 142 for reducing the inflow of the fluid to be measured into the upstream aperture hole 142, and a first influent suppressor 150 is provided for the downstream aperture hole 144 for reducing the inflow of the fluid to be measured into the downstream aperture hole 144. A second influent suppressor 152 is provided on the upstream side of the ultrasonic wave propagation path 146 for reducing the inflow of the fluid to be measured into the upstream and downstream aperture holes 142 and 144. The second influent suppressor 152 is fit into a depression 154 provided in the flow path wall 134.

Figure 11:
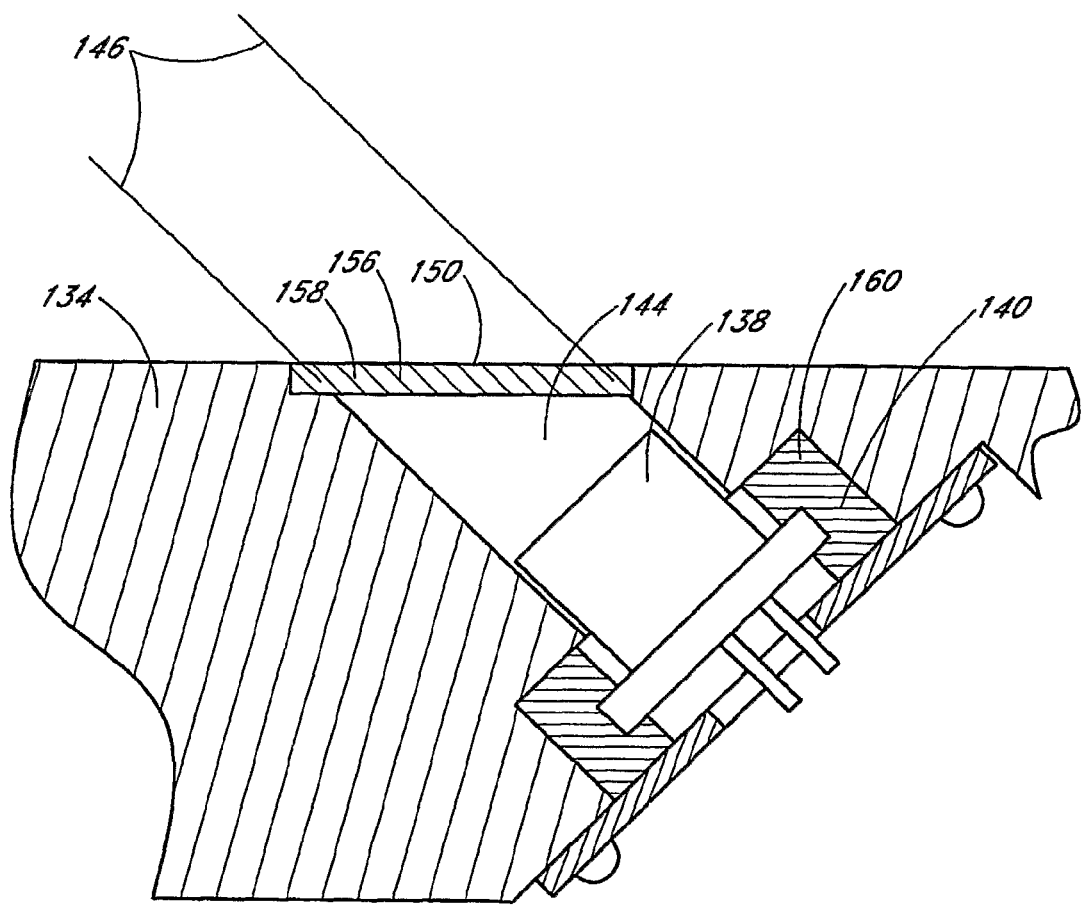
FIG. 11 shows a sectional view of the first influent suppressor shown in FIG. 10.

As shown in FIG. 11, the first influent suppressor 150 provided for the downstream aperture hole 144 has an aperture hole sealing section 156 having many ultrasonically transmissive holes 158 capable of transmitting an ultrasonic wave therethrough. The aperture hole sealing section 156 is provided across the ultrasonic wave propagation path 146 so as to cover the aperture hole 144 and extend coplanarly with a measurement flow path surface 160, thereby preventing the inflow of the fluid to be measured into the aperture hole 144. Herein, the aperture hole sealing section 156 is a mesh, or the like, having many ultrasonically transmissive holes 158 capable of transmitting an ultrasonic wave therethrough, which is directly provided in a portion of the measurement flow path surface 160 of the measurement flow path 132 corresponding to the aperture hole 144 and is coplanar with the measurement flow path surface 160 so as not to disturb the flow.

Figure 12:
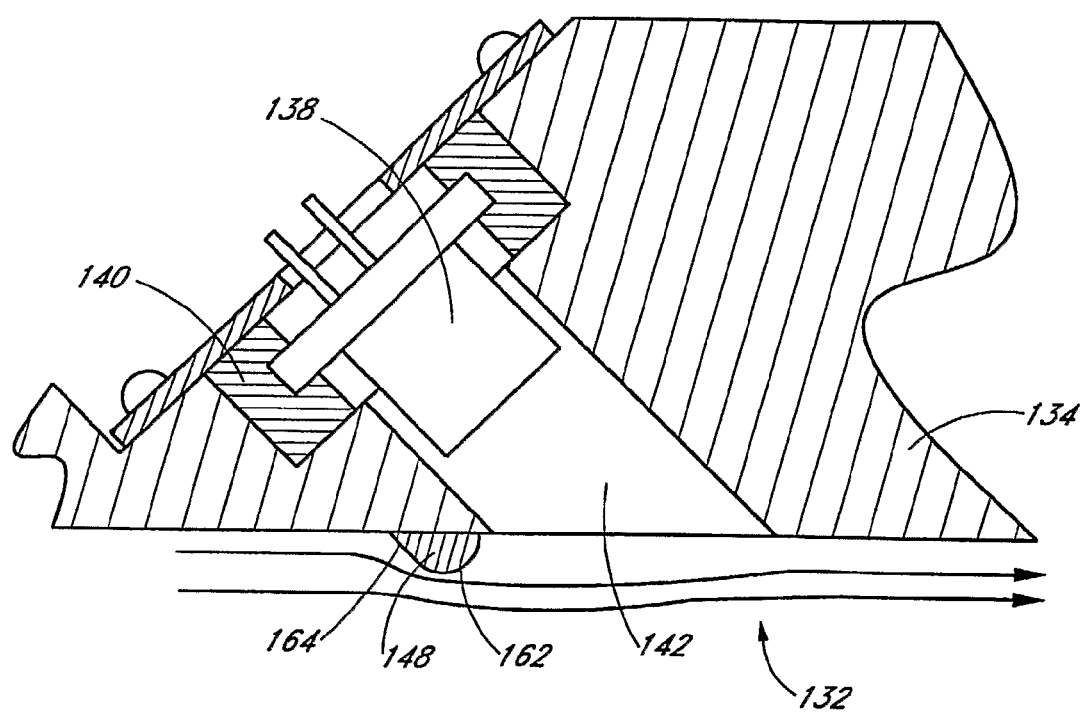
FIG. 12 shows a sectional view of an alternative first influent suppressor.

As shown in FIG. 12, the influent suppressor 148 provided for the upstream aperture hole 142 protrudes from the flow path wall 134 and includes a flow deflector 162 in the form of a smooth protrusion and a guide surface 164 provided on the upstream side of the flow deflector 162 with smoothly increasing protrusion heights.

The second influent suppressor 152 provided on the upstream side of the ultrasonic wave propagation path has a direction regulation section 166 for adjusting the flow direction of the fluid to be measured and a variation suppressing section 168 for making the flow velocity distribution uniform or reducing the pulsation of the flow. The direction regulation section 166 includes partition walls for dividing the cross section of the measurement flow path 132 into small portions. The variation suppressing section 168 has a small length along the flow direction and has many minute communication paths along the cross section of the measurement flow path 132.

A measurement control section 174 is connected to the ultrasonic transducers 136 and 138 for effecting the transmission and reception of an ultrasonic wave, and a calculation section 176 is provided for calculating the flow velocity based on a signal from the measurement control section 174 so as to calculate the flow rate.

Next, the flow rate measurement operation using an ultrasonic wave will be described. Along the ultrasonic wave propagation path 146 of the measurement flow path 132, an ultrasonic wave is transmitted and received between the ultrasonic transducers 136 and 138 across the measurement flow path 132 by the function of the measurement control section 174. Specifically, the propagation time T1, the amount of time required for an ultrasonic wave emitted from the upstream ultrasonic transducer 136 to be received by the downstream ultrasonic transducer 138, is measured. The propagation time T2, the amount of time required for an ultrasonic wave emitted from the downstream ultrasonic transducer 138 to be received by the upstream ultrasonic transducer 136, is also measured.

The flow rate is calculated by the calculation section 176 based on the measured propagation times T1 and T2 according to the expressions shown below.

Where the flow velocity of the fluid to be measured along the longitudinal direction of the measurement flow path 132 is denoted by V, the angle between the flow direction and the ultrasonic wave propagation path 146 is denoted by θ, the distance between the ultrasonic transducers 136 and 138 is denoted by L, and the sound velocity through the fluid to be measured is denoted by C, the flow velocity V is calculated based on the following expressions.

$$T1 = L/(C + V \cos \theta)$$

$$T2 = L/(C - V \cos \theta)$$

The following expression can be obtained by eliminating the sound velocity C from an expression of subtracting the inverse number of T2 from the inverse number of T1.

$$V = (L/2 \cos \theta)((1/T1) - (1/T2))$$

Since the values of θ and L are known, the flow velocity V can be calculated from the values of T1 and T2. Consider a measurement of the flow rate of an air where angle θ=45', distance L=70 mm, sound velocity C=340 m/s, and flow velocity V=8 m/s. Then, $T1 = 2.0 \times 10^{-4}$ sec and $T2 = 2.1 \times 10^{-4}$. Thus, an instantaneous measurement is possible.

Next, from the transverse-sectional area S of the measurement flow path 132 along the direction perpendicular to the flow direction, the flow rate Q' is obtained as follows.

$$Q = KVS$$

Herein, K is a correction coefficient which is determined in view of the flow velocity distribution across the transverse-sectional area S.

Thus, the flow rate is obtained by the calculation section 176.

Next, the flow condition in the measurement flow path of the ultrasonic flow meter and the measurement operation thereof will be described. The fluid to be measured may enter the measurement flow path 132 with a non-uniform flow or a flow pulsation. In such a case, the flow in the measurement flow path 132 is rectified and the flow disturbance is reduced by the direction regulation section 166 of the second influent suppressor 152 provided on the upstream side of the ultrasonic wave propagation path 146 to a direction such that the fluid does not easily flow into the aperture holes 142 and 144, while disturbances from variations in the flow due to a pulsating flow, or the like, are reduced by the variation suppressing section 168 so as to further suppress the fluid flow into the aperture holes 142 and 144. Then, the flow enters the ultrasonic wave propagation path 146. The variation suppressing section 168 may be a meshed member, a foamed member, a microporous plate, a non-woven fabric, or the like, with a large aperture ratio, which can be provided to have a small thickness along the flow direction. Thus, it is possible to reduce pressure losses by the variation suppressing section 168, whereby it is possible to reduce variations in the flow along the measurement flow path without increasing the pressure loss. Moreover, it is possible to reduce variations in the flow in a zone where the flow velocity is high so as to suppress variations in the propagation time of the ultrasonic wave, whereby it is possible to increase the upper limit value for the flow rate or flow velocity measurement and to further increase the measurement precision.

Next, in the aperture hole 144 which is opened in front of the downstream ultrasonic transducer 138 where a strong vortex easily occurs because the aperture hole 144 extends in a direction at an acute angle with respect to the measurement flow path, the aperture hole sealing section 156 such as a mesh having many ultrasonically transmissive holes 158 capable of transmitting an ultrasonic wave therethrough is provided along the measurement flow path surface 160 of the measurement flow path 132 for the flow rectified by the second influent suppressor 152 to be coplanar with the measurement flow path surface 160 so as not to disturb the flow. Thus, it is possible to further increase the effect of suppressing the flow of the fluid to be measured into the downstream aperture hole 144 and to significantly reduce the vortices or flow disturbances in the ultrasonic wave propagation path 146. For the upstream aperture hole 142, on the other hand, the first influent suppressor 148 is formed by the flow deflector 162 in the form of a protrusion provided near and on the upstream side of the aperture hole 142 so as to further reduce the flow of the fluid into the aperture hole 142 as indicated by arrows in FIG. 12, thereby reducing flow disturbances such as vortices and stabilizing the flow. Since the upstream aperture hole 142 extends in a direction at an obtuse angle with respect to the measurement flow path 132, the intensity of any vortex is smaller than that for the downstream aperture hole 144. Thus, the adverse influence thereof is small, and it may not be necessary to provide the first influent suppressor 148. However, by providing the first influent suppressor 148 for the upstream aperture hole 142, it is possible to further stabilize the flow. Moreover, the first influent suppressor 148 may be formed integrally with the flow path wall 134 so as to simplify the structure and reduce the cost.

Thus, the ultrasonic waves are transmitted and received between the ultrasonic transducers 136 and 138 along the ultrasonic wave propagation path 146 where the flow is stabilized. Thus, it is possible to increase the ultrasonic reception level, thereby realizing a high-precision flow velocity measurement, and to reduce the attenuation of the ultrasonic waves due to variations in the flow, thereby increasing the upper limit value for the flow rate measurement.

Moreover, since the ultrasonic reception level can be improved by the stabilization of the flow, it is possible to reduce the power consumption for the transmission of an ultrasonic wave. In addition, when the aperture hole sealing section 156 is provided only for the downstream aperture hole 144, it is possible to reduce the amount of attenuation of the ultrasonic wave through the aperture hole sealing section 156 and to reduce the power consumption by the reduction in the driving power input for the ultrasonic transducers 136 and 138.

RFID Tag Power and Data Collection and Storage

Preferred embodiments of the reverse osmosis devices and systems of the present invention comprise RFID tags. RFID tags are well known in the prior art, and are disclosed in U.S. Pat. Nos. 5,461,385; 5,528,222; and 6,525,648; which are all hereby incorporated in their entirety by reference.

In one embodiment, energy from activated RFID tags powers flow and conductivity measuring devices. In preferred embodiments, such measuring devices are preferably adapted to collect data and transfer the data to RFID tags or other data retrieving devices. The measuring devices preferably comprise a computing device that is configured to process the data collected from its measurements. The measuring devices may preferably send the data directly to a retrieving device by means of a signal transponder. In other preferred embodiments, the measuring devices can send and/or store their collected data within their corresponding RFID tags. Information may preferably be retrieved immediately or at a later time from the RFID tags.

Preferred embodiments of the present invention allow periodic monitoring of reverse osmosis filtration devices and systems by providing a remote system including a radio frequency identification (RFID) tag that is specifically and periodically in communication with a remote data collection and transfer device, such as a flow meter or conductivity meter, configured to communicate with RFID tags. In one embodiment, each specific RFID tag is associated with a particular remote data collection and transfer device. When an RFID tag receives a signal from the device, the specific RFID tag changes the state of the associated remote data collection and transfer device from a zero power state to an operational state. In this manner, the limited power-capacity of a remote power supply is used for data collection and transfer between the data collection and transfer device and an administrator and not for standby or periodic powering of non-data collection and transfer operations.

In preferred embodiments of the present invention, although many RFID signals may be transmitted over time to the location of many remote systems, each of which preferably comprises an RFID tag, measurement data is not always needed from each remote system, and thus, an RFID signal may be infrequently directed to a specific one of the RFID tags. That is, such an RFID signal is transmitted to request a data transfer operation with the particular remote data collection and transfer device that is associated with that specific RFID tag. Further, at the end of the operational (i.e., data transfer) state of that particular remote data collection and transfer device, the state of that data collection and transfer device is returned to the zero power state. Each RFID tag is preferably a passive beam-powered tag. As a result of factors such as: (1) the zero power state, (2) the specificity and periodicity of the RFID signal, (3) such return to the zero power state, and (4) the use of the specific selected passive beam-powered RFID tag, the zero power state is the primary state from a temporal standpoint, such that for substantial periods of time no power is drawn from the limited power-capacity of the remote power supply.

Yet another aspect of the present invention is to provide the remote system with a wireless local area network (WLAN) accessible to a particular remote data retrieval device for communicating with an administrator that may request a data transfer operation with that particular remote data collection and transfer device. The data transfer is effected over the WLAN and may be data transferred to or from, or both to and from, the particular remote data collection and transfer device. In any case, the data transfer may be between the administrator and the particular remote data collection and transfer device, or between the particular remote data collection and transfer device and another remote unit serviced by the administrator, e.g., a system that monitors or provides the data that is transferred.

Additionally, an aspect of the present invention includes a method of periodically providing data to or from a remote area. The method may include operations of providing a plurality of individual data collection and transfer units in the remote area. Each of the remote data collection and transfer units is normally in a zero power (OFF) state, and has an operational (ON) state for operation. A unique RFID signal is periodically transmitted to the remote area only at a separate specific time at which it is desired to provide data to or from a particular one of the data collection and transfer units that corresponds to the unique signal. Thus, each unique individual one of the RFID signals is designed to identify only the particular one of the remote data collection and transfer units that is selected. In response to the unique RFID signal, the particular one of the units is thus selected, e.g., identified, and then caused to be in the operational state. In the operational state, data is transferred to and from that selected data collection and transfer unit. In another embodiment, a response may be obtained from all RFID tags. Such a response may be obtained, for example, after system restart.

In a preferred embodiment of this aspect, as shown in FIG. 13, a data retrieval device 177 periodically transmits radio frequency identification (RFID) signals 178 via an antenna 180 to a remote location at which there may be one remote system 182. In the exemplary embodiment of FIG. 13, a plurality of the remote systems 182 are illustrated.

In one embodiment, the data retrieval device 177 comprises a computing device; for example, a personal computer that is either IBM, Macintosh, or Linux/Unix compatible. In another embodiment, the data retrieval device comprises a handheld computing device. In one embodiment, the exemplary data retrieval device 177 includes a central processing unit ("CPU"), which may include a conventional microprocessor. The data retrieval device may further include a memory, such as random access memory ("RAM") for temporary storage of information and a read only memory ("ROM") for permanent storage of information, and a mass storage device, such as a hard drive, diskette, or optical media storage device. The exemplary data retrieval device 177 may include one or more commercially available input/output (I/O) devices, such as a keyboard, mouse, touchpad, and printer. In one embodiment, the I/O devices include a display device, such as a monitor, that allows the visual presentation of data to a user. More particularly, the display device provides for the presentation of graphical user interfaces, application software data, and multimedia presentations, for example. The data retrieval device 177 may also include one or more multimedia devices, such as speakers, monitors, video cards, graphics accelerators, game controllers, etc.

The computing device of the data retrieval device 177 may be generally controlled and coordinated by operating system software, such as the Windows 95, 98, NT, 2000, XP or other compatible operating systems. In Macintosh systems, the operating system may be any available operating system, such as Mac OS X. Conventional operating systems control and schedule computer processes for execution, perform memory management, provide file system, networking, and I/O services, and provide a user interface, such as a graphical user interface ("GUI"), among other things.

In the exemplary embodiment of FIG. 13, a unique RFID signal 178 is received by each remote system 182 via an antenna 192. However, only one selected particular remote system 182 is identified by a unique signal 178 and is provided with RF energy by such signal 178. The energy from the signal 178 is used to change the state of the particular remote system 182 from a normally zero power (or OFF) state to an operational (or ON) state. In the operational state, the selected particular remote system 182 identified by the signal initiates a data transfer, which may, for example, be in the form of data transfer RF signals 184 sent from the antenna 192 of the remote system 182 to the data retrieval device 177.

Figure 14A:
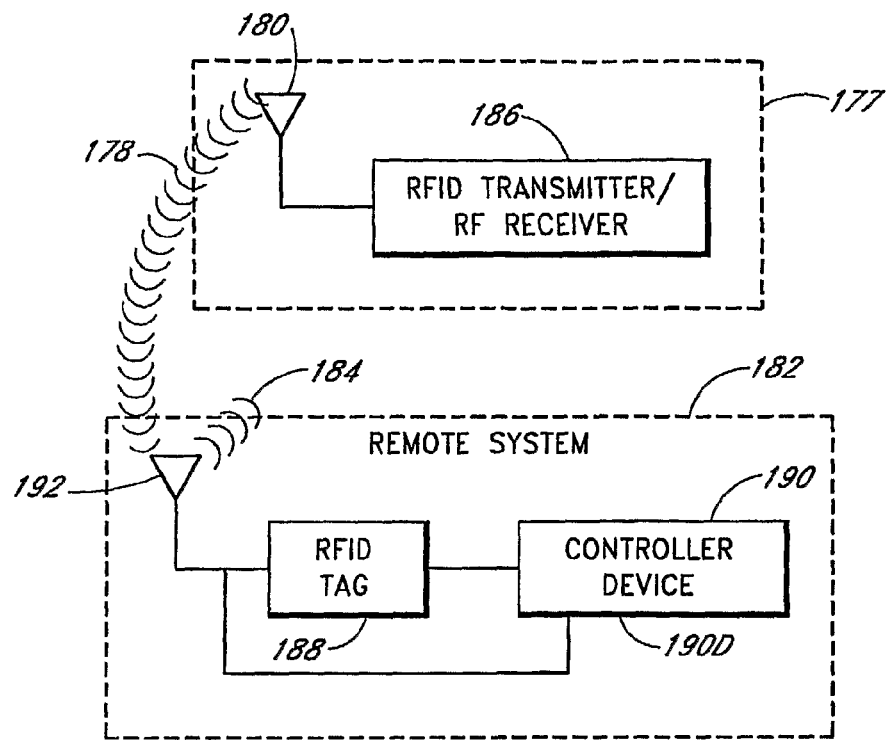
FIGS. 14A and 14B show schematic diagrams of systems employing RFID signals for communication in accordance with embodiments of the invention.
Figure 14B:
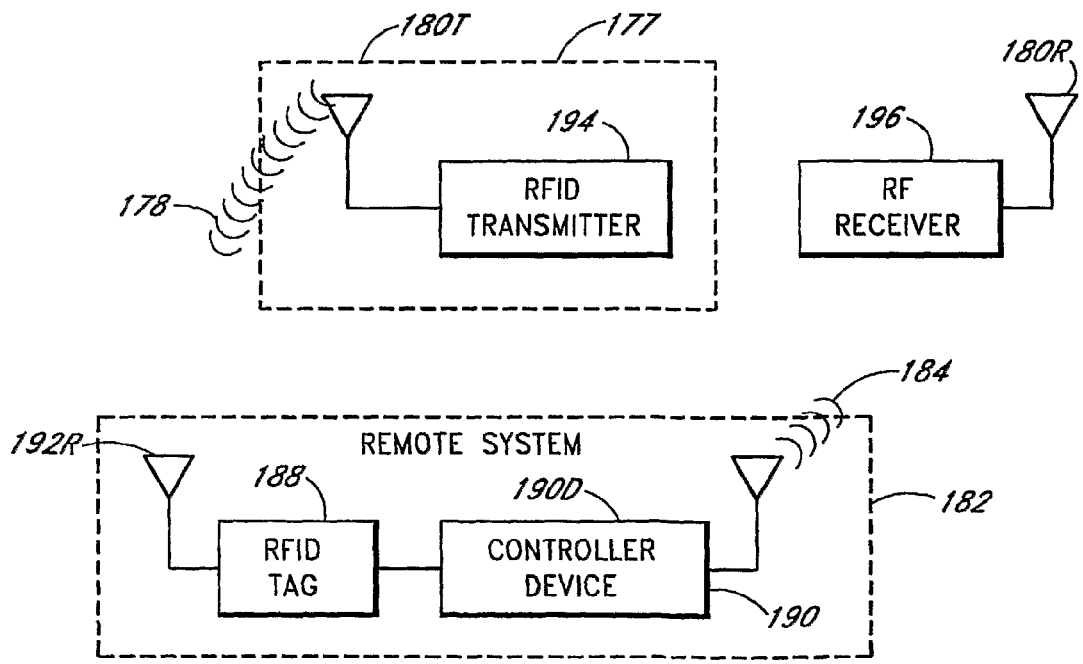

As shown in FIGS. 14A and 14B, in other embodiments including the data retrieval device 177 and at least one of the remote systems 182, the data retrieval device 177 includes an RFID transmitter/receiver 186 for transmitting the unique RFID signals 178 to the remote systems 182. The RF transmitter/receiver 186 also receives the data transfer signals 184 from the selected remote system 182. The data retrieval device 177 may directly use the transferred data of the data transfer signals 184, or may distribute such data to other devices as appropriate.

In another embodiment, as shown in FIG. 14A, each of the systems 182 includes a radio frequency identification (RFID) transponder, or tag, 188. Associated with a specific tag 188, the remote systems 182 also include a controlled device 190 such as an electronic circuit, a conductivity meter, or a fluid flow meter. The reference to controlled devices indicates that the state of the controlled devices 190 is controlled by the associated tag 188. In the preferred embodiments of the present invention, the controlled device 190 is a remote data transfer device 190D. The remote system 182 uses an antenna 192, which may include one or more receiving and transmitting elements, which may both receive the incoming RFID signal 178 and transmitting the outgoing data transfer signal 184. The incoming RFID signal 178 and the outgoing data transfer signal 184 may each be at the same frequency.

In another embodiment, as shown in FIG. 14B, the data retrieval device 177 may include a separate RF transmitter 194 having a separate transmitter antenna 180T. A separate RF receiver 196 is provided with a different receiver antenna 180R. In this manner, the incoming RF signal 178 may have one frequency, such as 900 MHz for example, and the outgoing data transfer signal 184 may have a different frequency, such as 2.45 GHz, for example.

The RF receiver 196 may represent a user of data positioned at a location which may be remote from the data retrieval device 177 and from the remote system 182. For example, the RF receiver 196 may be a requesting station that communicates via a modem (not shown) with the RF transmitter 194 to request a data transfer from a particular one of the remote systems 182. The RF transmitter 194 may also request that specific data be transferred without specifying which remote system 182 is storing that specific data. Alternatively, the RF transmitter 194 may serve as controller for a data storage device. In the latter example, the transmitter 194 serving as a controller will specify which of the remote systems 182 currently stores the requested data, and will transmit the unique RFID signal 178 properly coded to identify the particular remote system 182 that has the requested data.

As shown in FIG. 14C, the controlled device 190 primarily exists in a zero power state, also referred to as an "OFF" state. In this state, shown as state 1 in FIG. 14C, the controlled device 190 uses no (i.e., "zero") power. The controlled device 190 also has an operational state 2 or "ON" state. When the controlled device 190 is a remote data transfer device 190D, for example, and the remote data transfer device 190D is mobile, for example, the periods of time during which the remote data transfer device 190D is in the zero power state 1 greatly exceed the periods of time during which the remote data transfer device 190D is in the operational state 2. For example, typically data transfer is required with a remote data transfer device 190D twice per day. Assuming 2 megabytes of data must be transferred, each data transfer may last 30 seconds, for example. Thus, each day the remote data transfer device 190D would be in the zero power state about 23 hours and 59 minutes, and would only be in the operational state about 1 minute. It is to be understood that the exemplary 2 megabytes of data to be transferred by far exceeds the data storage capacity of a typical RFID tag 188. Therefore, if the amount of data to be transferred is much less than 2 megabytes, the remote data, transfer device would be in the operational state much less than 1 minute per day.

The cumulative power used by the controlled device 190 in one day is based on the power used in only the operational states. In the prior art, the cumulative power used includes that required for the operational state, plus the much greater amount of power for standby operation. Thus, the total power used in the polling and standby examples is greater by the significant amount required for the polling and standby functions. As described below, all of the power in the remote system 182 is available for powering the controlled device 190 in the operational state 2. The elimination of power for the polling and standby functions eliminates use of what is "wasted" power resulting in a substantial improvement in efficiency of use of a limited amount of power that is available at the remote system 182.

In another preferred embodiment of the present invention, the RFID tag possesses a rechargeable battery, which can be used to provide power to the RFID tag and/or the measuring devices. An RFID tag having a combined battery and passive power source is disclosed in U.S. Pat. No. 6,944,424, which is hereby incorporated in its entirety by reference.

One preferred embodiment of the present invention comprises an RFID tag that is powered both by an internal battery and passively by an interrogating RF field. As a result, the RFID tag can be passively powered after the internal battery has been depleted. In addition, the rechargeable battery can preferably provide power to data collection and transfer devices, such as flow and conductivity meters.

More particularly, an embodiment of the RFID tag includes electronic circuitry to provide RFID functionality, and an energy storage device coupled to the electronic circuitry to provide an operational voltage thereto. A battery is operatively coupled to the energy storage device to charge the energy storage device. A rectified RF power source derived from an interrogating RF field is also operatively coupled to the energy storage device to charge the energy storage device. The rectified RF power source and the battery are electrically separated from each other. The energy storage device remains charged by the battery in the absence of the RF interrogating field while the battery has remaining capacity. After the battery has become depleted, the energy storage device is charged by the presence of the RF interrogating field.

Figure 15:
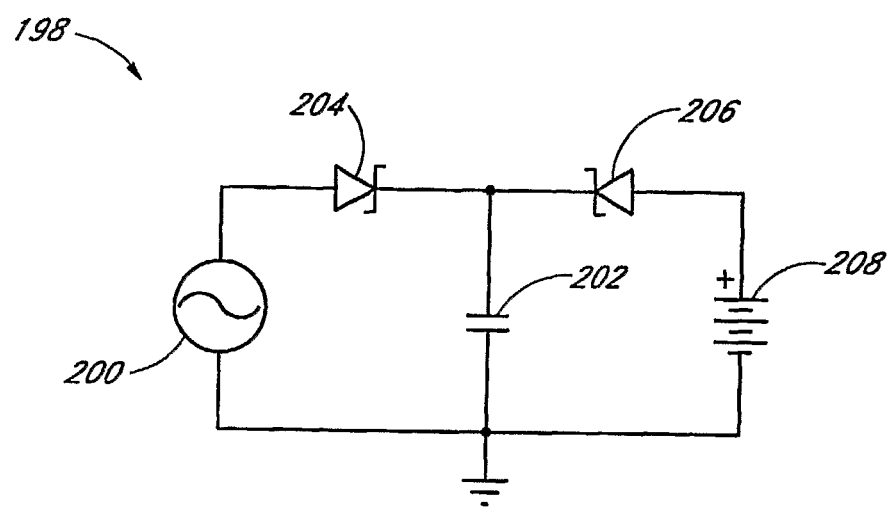
FIG. 15 shows a block diagram of a dual power mode circuit for an RFID tag system in accordance with an embodiment of the invention.

In a preferred embodiment, as shown in FIG. 15, a dual power mode circuit 198 for an RFID tag includes an RF source 200, an energy storage capacitor 202, a first diode 204, a second diode 206, and a battery 208. The RF source 200 is provided by the interrogating RF field transmitted by an RFID reader that is rectified by the RF front end of the RFID tag (not shown). The energy storage capacitor 202 serves as a voltage source for the remaining circuitry of the RFID tag (not shown), and is coupled to the RF source 200 and the battery 208 in separate, respective charging circuits. More particularly, a first charging circuit includes the RF source 200, the first diode 204, and the energy storage capacitor 202. The first diode 204 is coupled between the RF source 200 and the energy storage capacitor 202 in a forward biased manner so that current from the RF source 200 flows to the energy storage capacitor 202, and not in reverse. A second charging circuit includes the battery 208, the second diode 206, and the energy storage capacitor 202. The second diode 206 is coupled between the battery 208 and the energy storage capacitor 202 in a forward biased manner so that current from the battery 208 flows to the energy storage capacitor 202, and not in reverse. In a preferred embodiment of the invention, the first and second diodes 204 and 206 are provided by Schottky diodes.

It should be appreciated that the two charging circuits are disparate from each other, and there is no coupling between the RF source 200 and the battery 208. Current from the RF source 200 will not flow to the battery 208, and current from the battery 208 will not flow to the RF source 200. Thus, the energy storage capacitor 202 is charged by both the RF source 200 and the battery 208. In the absence of an RF interrogating field, the RFID tag will remain powered by the battery 208 maintaining the energy storage capacitor 202 in a charged state. When the battery 208 becomes depleted, the RFID tag will be powered passively by the presence of an RF interrogating field.

Further embodiments of the present invention comprise measuring devices that are powered by magnetic or electromagnetic energy, or by other forms of energy known to those of skill in the art.

Although the foregoing description contains many specifics, these should not be construed as limiting the scope of the present invention, but merely as providing illustrations of some of the presently preferred embodiments. Similarly, other embodiments of the invention may be devised which do not depart from the spirit or scope of the present invention. All additions, deletions and modifications to the invention as disclosed herein which fall within the meaning and scope of the claims are to be embraced thereby.

What is claimed is:

1. A reverse osmosis system for filtering a liquid to obtain a permeate, comprising:
    a pressure tube;
    a plurality of membrane filter devices enclosed within the pressure tube, each of the membrane filter devices comprising a permeate tube associated with the membrane filter device and each of the membrane filter devices having its own associated radio frequency identification (RFID) tag associated with the membrane filter device configured to store data and wirelessly transmit the data;
    a conductivity measuring device disposed within each permeate tube and configured to measure permeate conductivity data for the associated membrane filter device and transfer the conductivity data to said RFID tag associated with the membrane filter device;
    a permeate flow measuring device disposed within each permeate tube and configured to measure permeate flow data for the associated membrane filter device and transfer the permeate flow data to the RFID tag associated with the membrane filter device; and
    a data retrieval device configured to receive permeate conductivity data and permeate flow data transmitted by the RFID tags and to calculate values indicative of the performance of the membrane filter devices;
    wherein the RFID tags are further configured to power on and off each of the conductivity measuring devices and permeate flow measuring devices in the pressure tube.

2. The system of claim 1, wherein the permeate flow measuring device is a fluid flow meter.

3. The system of claim 2, wherein the fluid flow meter is an electromagnetic flow meter.

4. The system of claim 2, wherein the fluid flow meter comprises a rotatable member.

5. The system of claim 2, wherein the fluid flow meter comprises a strain gauge.

6. The system of claim 2, wherein the fluid flow meter comprises an ultrasonic flow meter.

7. The system of claim 1, wherein the conductivity measuring device comprises an electrode.

8. The system of claim 1, wherein the conductivity measuring device comprises an electrodeless device.

9. The system of claim 1, wherein at least one of the conductivity measuring device and the permeate flow measuring device is powered by a battery.

10. The system of claim 9, wherein the battery is rechargeable.

11. The system of claim 10, wherein the battery is recharged by the RFID tag.

12. The system of claim 1, wherein the membrane filter devices are spiral wound membrane filter devices.

13. The system of claim 1, wherein the RFID tags store the measured permeate conductivity data and permeate flow data.

14. The system of claim 1, wherein the calculated value is a normalized salt passage percentage.

15. The system of claim 1, wherein the RFID tags are configured to store preloaded values relating to the membrane filter devices.

16. The system of claim 15, wherein the preloaded values are selected from lot number, production data, shipping data, and initial performance data of the membrane filter devices.

17. The system of claim 16, wherein the preloaded values and the measured values are transferred to the data retrieval device via communication with the RFID tags, and the data retrieval device is configured to use the preloaded values and the measured values to calculate the values indicative of the performance of the membrane filter devices.

18. The system of claim 15, wherein the preloaded values and the conductivity and permeate flow data are transferred to the data retrieval device via communication with the RFID tags, and the data retrieval device is configured to employ the preloaded values and the permeate conductivity and permeate data to calculate a normalized dissolved solids passage percentage.

19. The method of claim 1, wherein the calculated performance values are normalized salt passage percentages.

20. The method of claim 1, wherein a date of production of each membrane filter device is employed in the calculating step.

21. A method of maintaining an array of membrane filter devices for a reverse osmosis system that filters a fluid to obtain a permeate, comprising:
    measuring values of conductivity and permeate flow through each of of said membrane filter devices, the measured permeate conductivity and measured permeate flow values obtained with permeate conductivity measuring devices and permeate flow measuring devices, respectively, each of said membrane filter devices having its own associated permeate conductivity measuring device and permeate flow measuring device;
    transferring information concerning the values measured at each membrane filter device to associated RFID tags in the system, each membrane filter device having its own associated RFID tag;
    remotely receiving the information from the RFID tags;
    calculating values indicative of the performance of the membrane filter devices from the measured values;
    replacing each membrane filter device according to the value calculated; and
    powering on and off each of the conductivity measuring devices and permeate flow measuring devices with the RFID tags.

22. The method of claim 21, wherein the measuring step is conducted periodically.

* * * * *